United States Patent
Yoshizumi et al.

(10) Patent No.: US 9,239,540 B2
(45) Date of Patent: Jan. 19, 2016

(54) DEVELOPING DEVICE AND MANUFACTURING METHOD THEREOF

(71) Applicant: BROTHER KOGYO KABUSHIKI KAISHA, Nagoya-shi, Aichi-ken (JP)

(72) Inventors: Hikaru Yoshizumi, Handa (JP); Junichi Yokoi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/667,233

(22) Filed: Mar. 24, 2015

(65) Prior Publication Data
US 2015/0277278 A1    Oct. 1, 2015

(30) Foreign Application Priority Data

Mar. 31, 2014    (JP) ................................. 2014-074853

(51) Int. Cl.
| | | |
|---|---|---|
| G03G 15/08 | (2006.01) | |
| B23K 26/24 | (2014.01) | |
| B23K 26/08 | (2014.01) | |

(52) U.S. Cl.
CPC ............. *G03G 15/0812* (2013.01); *B23K 26/08* (2013.01); *B23K 26/24* (2013.01)

(58) Field of Classification Search
USPC ......... 399/107, 110, 111, 119, 120, 252, 264, 399/265, 274, 279, 284
See application file for complete search history.

(56) References Cited

U.S. PATENT DOCUMENTS

| | | | |
|---|---|---|---|
| 6,175,708 B1 | 1/2001 | Ohashi | |
| 6,298,203 B1* | 10/2001 | Hashimoto | G03G 15/0812 399/119 |
| 8,280,282 B2* | 10/2012 | Blanck | G03G 15/0812 399/284 |
| 8,831,487 B2* | 9/2014 | Kashiide | G03G 15/0812 399/126 |
| 8,995,891 B2* | 3/2015 | Itabashi | G03G 21/1821 399/284 |
| 2001/0031158 A1 | 10/2001 | Yokomori et al. | |
| 2004/0120734 A1 | 6/2004 | Okamoto | |
| 2008/0118280 A1 | 5/2008 | Han et al. | |
| 2009/0188897 A1 | 7/2009 | Margairaz et al. | |
| 2009/0310628 A1 | 12/2009 | Yamazaki | |

(Continued)

FOREIGN PATENT DOCUMENTS

| | | |
|---|---|---|
| GB | 2 239 205 A | 6/1991 |
| JP | 2011356592 A | 12/2001 |

OTHER PUBLICATIONS

U.S. Appl. No. 14/230,916, filed Mar. 31, 2014 (31 pages).

(Continued)

*Primary Examiner* — Hoan Tran
(74) *Attorney, Agent, or Firm* — Merchant & Gould PC

(57) ABSTRACT

There is provided a method for manufacturing a developing device including a developer carrier having a rotation axis extending in a first direction, a blade and including a first end portion and a second end portion, and a supporting member supporting the blade. The method includes the steps of positioning the blade, and welding the blade onto the supporting member by irradiating a laser beam onto the blade while moving at least one of the blade and the laser beam relative to the other of the blade and the laser beam. The positioning includes positioning the first end portion in the first direction and a second direction perpendicular to the first direction, and positioning the second end portion in the second direction without being positioned with respect to the first direction. The welding includes moving the laser beam from a first end portion side toward a second end portion side.

23 Claims, 21 Drawing Sheets

(56) References Cited

U.S. PATENT DOCUMENTS

2012/0272611 A1   11/2012   Tsukimoto et al.
2015/0093156 A1   4/2015    Yokoi et al.
2015/0093157 A1   4/2015    Yokoi et al.

OTHER PUBLICATIONS

U.S. Appl. No. 14/230,755, filed Mar. 31, 2014 (34 pages).

Office Action issued in related U.S. Appl. No. 14/230,916, mailed Feb. 10, 2015 (14 pages).
Office Action issued in related U.S. Appl. No. 14/230,755, mailed Feb. 23, 2015 (17 pages).
Office Action issued in related U.S. Appl. No. 14/230,755, mailed Jun. 26, 2015.
Office Action issued in related U.S. Appl. No. 14/230,755, mailed Nov. 13, 2015.

* cited by examiner

DEVELOPING DEVICE AND MANUFACTURING METHOD THEREOF

CROSS-REFERENCE TO RELATED APPLICATION

This application claims priority from Japanese Patent Application No. 2014-074853, filed on Mar. 31, 2014, which is incorporated herein by reference in its entirety.

TECHNICAL FIELD

Aspects disclosed herein relate to a developing device including a blade unit in which a blade is joined to a supporting member by welding, and a manufacturing method of the developing device.

BACKGROUND

A known electrophotographic image forming apparatus includes a developing device including a developing roller and a blade unit for regulating a thickness of a developer layer held on the developing roller. The blade unit includes a blade and a supporting member that are joined to each other by welding. The blade is in contact with the developing roller. The supporting member holds the blade in an overlapping manner.

SUMMARY

At the time of positioning the blade with respect to the supporting member, for example, one end portion of the blade may be aligned with respect to the supporting member in an extended direction of the blade (e.g., a direction along longer sides of the blade) and in a direction perpendicular to the extended direction of the blade (e.g., a direction along shorter sides of the blade) and the other end portion of the blade may be aligned in the direction perpendicular to the extended direction of the blade. Under this situation, in a case where welding of the blade to the supporting member is started from the other end side of the blade toward the one end side of the blade, the blade may thermally expand in the extended direction of the blade as a result of welding, whereby the one end portion of the blade may come into contact with a member for positioning the one end portion of the blade in the extended direction of the blade. This contact may cause deformation of the blade.

According to one or more aspects of the disclosure, a developing device may include a developer carrier having a rotation axis which extends in a first direction, a blade disposed adjacent to the developer carrier and including a first end portion and a second end portion opposite to the first end portion in the first direction, and a supporting member supporting the blade. The method for manufacturing the developing device may include the steps of positioning the blade with respect to the supporting member, and welding the blade onto the supporting member by irradiating a laser beam onto the blade while moving at least one of the blade and the laser beam relative to the other of the blade and the laser beam. The positioning may include positioning the first end portion of the blade with respect to the supporting member in the first direction and a second direction perpendicular to the first direction, and positioning the second end portion of the blade with respect to the supporting member in the second direction without being positioned with respect to the first direction. The welding may include moving the laser beam relative to the blade from a first end portion side of the blade toward a second end portion side of the blade.

According to one or more other aspects of the disclosure, a developing device may include a developer carrier having a rotation axis which extends in a first direction, a blade disposed adjacent to the developer carrier, and a supporting member joined to the blade by welding, and supporting the blade. The blade may include a first end portion in the first direction having a first engaging portion, a second end portion disposed opposite to the first end portion in the first direction and having a second engaging portion, and a first weld mark and a second weld mark formed between the first end portion and the second end portion and joining the blade to the supporting member. The supporting member may include a third engaging portion and a fourth engaging portion. The third engaging portion may be configured to engage with the first engaging portion such that the first engaging portion is positioned with respect to the third engaging portion in the first direction and a second direction perpendicular to the first direction. The fourth engaging portion may be configured to engage with the second engaging portion such that the second engaging portion is positioned with respect to the fourth engaging portion in the second direction without being positioned with respect to the first direction. The second weld mark may be located closer to the second engaging portion than the first weld mark and at least partially overlaps on the first weld mark.

DESCRIPTION OF THE DRAWINGS

Aspects of the disclosure are illustrated by way of example and not by limitation in the accompanying figures in which like reference characters indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings.

Figure 1:
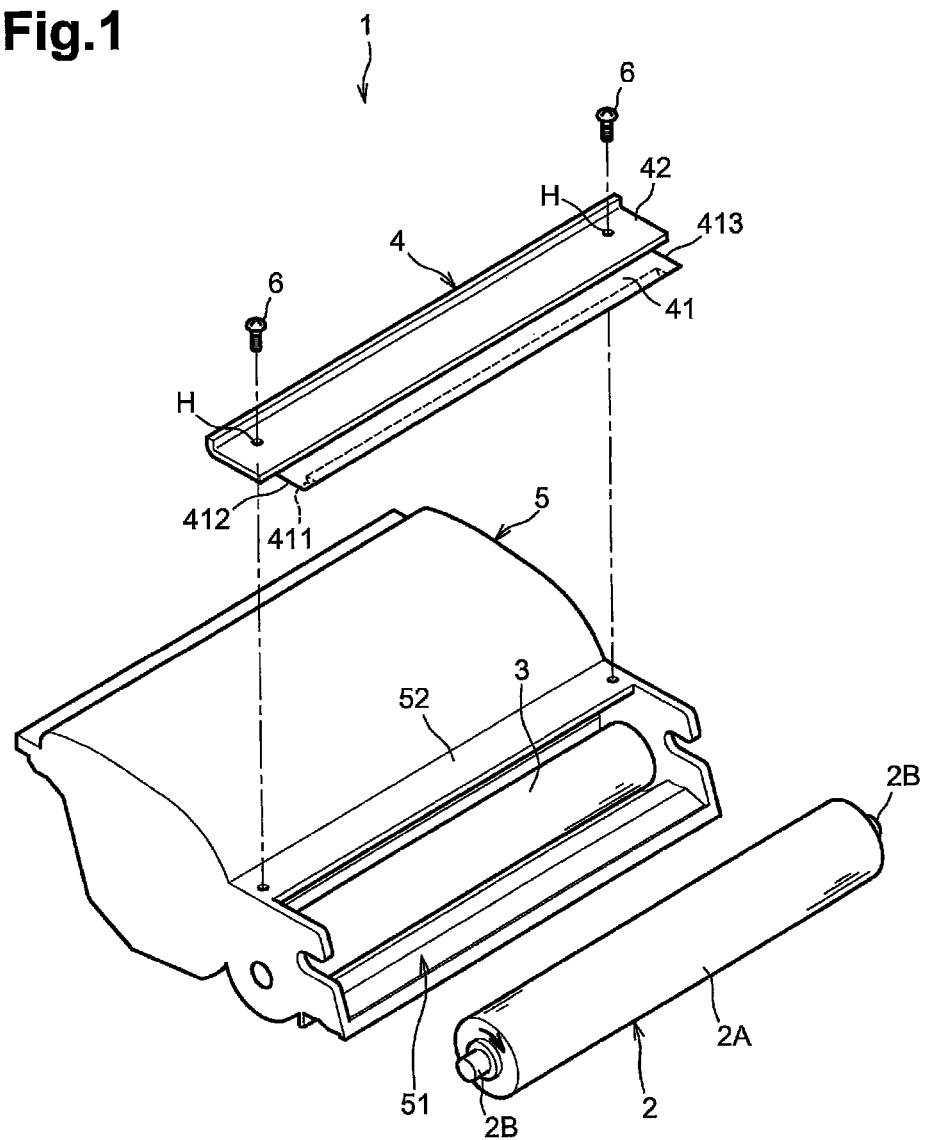
FIG. 1 is a disassembled perspective view depicting a developing device in an illustrative embodiment according to one or more aspects of the disclosure.

As depicted in FIG. 1, a developing device 1 includes a developing roller 2 (as an example of a developer carrier), a supply roller 3, a blade unit 4, and a developing case 5 that holds these components.

Figure 2:
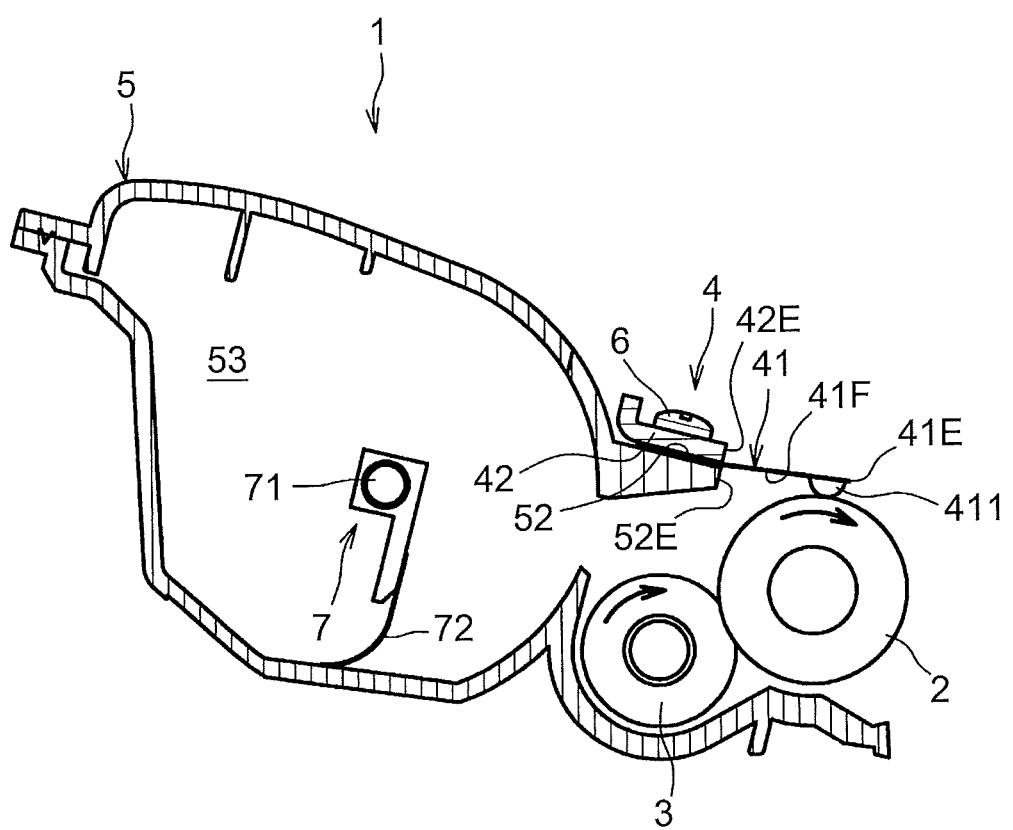
FIG. 2 is a sectional view depicting the developing device in the illustrative embodiment according to one or more aspects of the disclosure.

The developing case 5 may be a container having therein a toner storage chamber 53 capable of storing toner therein (refer to FIG. 2). The developing case 5 is formed to define an opening 51 in one of its surfaces. The developing case 5 defines an edge of the opening 51 and has a blade support surface 52 to which the blade unit 4 is fixed.

As depicted in FIG. 2, a conveyor member 7 for conveying toner toward the supply roller 3 is disposed in the toner storage chamber 53. The conveyor member 7 includes a shaft portion 71 and a film 72. The shaft portion 71 is rotatably supported by the developing case 5. The film 72 rotates along with rotation of the shaft portion 71.

As depicted in FIG. 1, the developing roller 2 includes a cylindrical roller body 2A and a shaft 2B. The shaft 2B is rotatable integrally with the roller body 2A while passing through the roller body 2A. The roller body 2A has elasticity and is capable of holding toner on its cylindrical peripheral surface. The developing roller 2 is disposed to close or partially close the opening 51 of the developing case 5. The shaft 2B protrudes from the roller body 2A in an axial direction of the developing roller 2 and is rotatably supported by the developing case 5.

The supply roller 3 is disposed inside the developing case 5 in contact with the developing roller 2, and is rotatably supported by the developing case 5. The supply roller 3 is configured to supply toner stored in the developing case 5 to the developing roller 2 as the supply roller 3 rotates.

The blade unit 4 includes a blade 41 and a supporting member 42. The blade 41 is disposed near the developing roller 2 such that a tip of the blade 41 is placed on a surface of the developing roller 2. The supporting member 42 holds the blade 41 welded thereto.

The blade 41 includes a sheet metal having an approximately rectangular shape (e.g., sheet metal having two longer sides and two shorter sides). The blade 41 is positioned so that a longer side of the blade 41 extends in a direction that an axis of the developing roller 2 extends (hereinafter, this direction is referred to as a longer direction, and is an example of the first direction). That is, a longer side of the blade 41 is approximately parallel to the axial direction of the developing roller 2, and a shorter side of the blade 41 is approximately perpendicular to a direction that the blade 41 and the supporting member 42 face each other and the axial direction of the developing roller 2 (hereinafter, this approximately perpendicular direction is referred to as a shorter direction, and is an example of the second direction). The blade 41 is made of metallic material, for example, stainless steel. In other embodiments, for example, the blade 41 may include a sheet metal whose surface may have a coating including press oil.

For example, the blade 41 may have a thickness of 0.05 to 2.5 mm, a thickness of 0.05 to 1.00 mm, a thickness of 0.05 to 0.12 mm, a thickness of 0.07 to 0.15 mm, or a thickness of 0.08 to 0.12 mm. A longer dimension (e.g., a length) of the blade 41 may be greater than a dimension of the roller body 2A of the developing roller 2 in the axial direction. For example, the blade 41 may have a length of 218 to 270 mm, a length of 220 to 260 mm, or a length of 222 to 250 mm.

The blade 41 include a contact portion 411, which protrudes toward the developing roller 2 and in direct contact with the roller body 2A of the developing roller 2. The contact portion 411 protrudes from a distal end 41E of a surface 41F that faces the developing roller 2 (refer to FIG. 2). The contact portion 411 is made of, for example, rubber and extends in the longer direction of the blade 41. In other words, the contact portion 411 is configured to regulate a thickness of a toner layer held on a surface of the developing roller 2. When the developing roller 2 holds a toner layer on the surface thereof, the contact portion 411 contacts the surface of the developing roller 2 via the toner layer.

The supporting member 42 is a member for fixing or otherwise holding a fixed end of the blade 41 to the developing case 5.

The supporting member 42 is made of metallic material, for example, electrolytic zinc-coated carbon steel sheet. The supporting member 42 has a thickness greater than the blade 41 and an approximately or substantially rectangular shape. A longer side of the supporting member 42 is positioned so that it extends in a direction that is approximately parallel to the longer side of the blade 41. The supporting member 42 extends beyond a first end 412 and a second end 413 of the blade 41 in the longer direction of the blade 41. That is, the longer side of the supporting member 42 is longer than the longer side of the blade 41.

The supporting member 42 extends over a surface of the blade 41 opposite to the surface 41F on which the contact portion 411 is disposed so that the supporting member 42 pinches the blade 41 in conjunction with the blade support surface 52 of the developing case 5. More specifically, the blade 41 is pinched between an edge 42E of the supporting member 42 and an edge 52E of the blade support surface 52. The edge 42E of the supporting member 42 and the edge 52E of the blade support surface 52 are positioned closer to the distal end 41E of the blade 41. A portion, which is in contact with the edge 42E of the supporting member 42 and the edge 52E of the blade support surface 52, of the blade 41 functions as a fulcrum when the blade 41 bends.

The blade unit 4 configured as described above is fixed to the developing case 5 using screws 6 through holes H in the blade 41 and the supporting member 42. In this state, the blade unit 4 is configured to regulate a thickness of a toner layer attaching to the developing roller 2. In particular, the contact portion 411 of the blade 41, which is in contact with the rotating developing roller 2, regulates a thickness of the toner layer by blocking excess toner from passing as the developing roller 2 rotates.

Figure 3A:
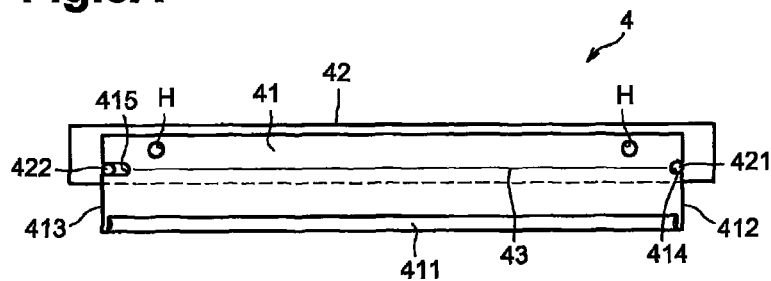
FIG. 3A illustrates a blade unit in the illustrative embodiment according to one or more aspects of the disclosure.
Figure 3B:
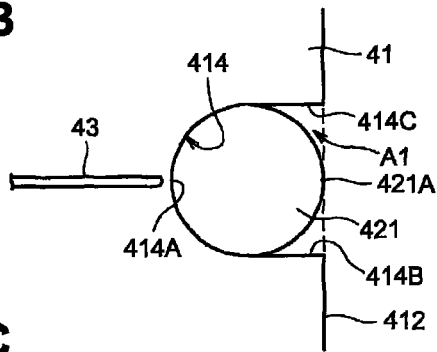
FIG. 3B is an enlarged view of a first opening defined in the blade in the illustrative embodiment according to one or more aspects of the disclosure.
Figure 3C:
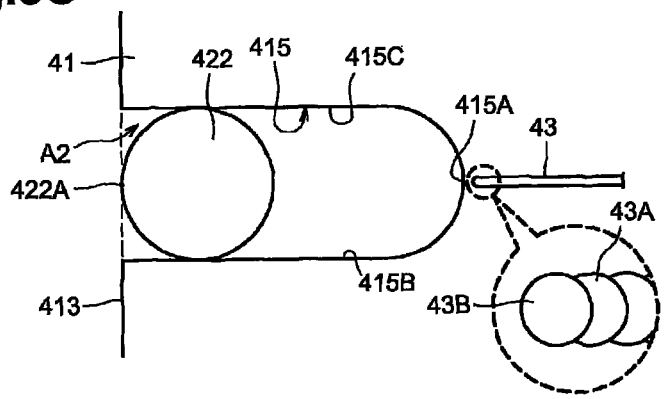
FIG. 3C is an enlarged view of a second opening defined in the blade in the illustrative embodiment according to one or more aspects of the disclosure.

As depicted in FIG. 3A, the supporting member 42 includes a first cylindrical protrusion 421 (as an example of the third engaging portion) and a second cylindrical protrusion 422 (as an example of the fourth engaging portion) at opposite end portions of the longer side of the blade 41. The first protrusion 421 and the second protrusion 422 protrude from a surface of the supporting member 42 that faces the blade 41. As depicted in FIGS. 3B and 3C, the blade 41 has a first opening A1 and a second opening A1. The blade 41 further has a first opening edge 414 (as an example of the first engaging portion) and a second opening edge 415 (as an example of the second engaging portion). The first opening A1 is defined by the first opening edge 414 at one end of the blade 41 in the longer direction of the blade 41 for receiving the first protrusion 421 of the supporting member 42. The second opening A2 is defined by the second opening edge 415 at the other end of the blade 41 in the longer direction of the blade 41 for receiving the second protrusion 422 of the supporting member 42.

In other words, in a state where the blade 41 is placed on the supporting member 42, an entire portion of the first protrusion 421 in a diameter direction of the first protrusion 421 is positioned within the first opening A1 and an entire portion of the second protrusion 422 in a diameter direction of the second protrusion 422 is positioned within the second opening A2. The first protrusion 421 and the second protrusion 422 may be in contact with or closer to the first opening edge 414 of the first opening A1 and the second opening edge 415 of the second opening A2, respectively, in a state where the entire portion of the first protrusion 421 in the diameter direction of the first protrusion 421 is positioned within the first opening A1 and the second protrusion 422 in the diameter direction of the second protrusion 422 is positioned within the second opening A2. For example, the entire portions of the first protrusion 421 and the second protrusion 422 in their diameter direction may be positioned within the first opening A1 and the second opening A2, respectively, while clearance is left between the first protrusion 421 and the first opening edge 414 and between the second protrusion 422 and the second opening edge 415. A distance or clearance between a protrusion and a corresponding opening edge may vary within appropriate ranges in which relative positions of a blade and a supporting member are fixed. For example, an allowable distance (e.g., clearance) between the first opening edge 414 and the first protrusion 421 in the shorter direction of the blade 41 is within 0 to 0.30 mm. In the illustrative embodiment, the distance therebetween in the shorter direction of the blade 41 is 0.065 mm. An allowable distance (e.g., clearance) between the first opening edge 414 and the first protrusion 421 in the longer direction of the blade 41 is within 0 to 0.30 mm. In the illustrative embodiment, the distance therebetween in the longer direction of the blade 41 is 0.065 mm. An allowable distance (e.g., clearance) between the second opening edge 415 and the second protrusion 422 in the shorter direction of the blade 41 is within 0 to 0.30 mm. In the illustrative embodiment, the distance therebetween in the shorter direction of the blade 41 is 0.065 mm. An allowable distance (e.g., clearance) between the second opening edge 415 and the second protrusion 422 in the longer direction of the blade 41 is 0.3 to 1.0 mm. In the illustrative embodiment, the distance therebetween in the longer direction of the blade 41 is 0.52 mm.

As depicted in FIG. 3B, the first opening edge 414 has a U shape and defines the first opening A1 such that the first opening A1 is recessed relative to the first end 412 of the blade 41 in the longer direction of the blade 41. The first opening edge 414 includes a first edge 414B, a second edge 414C, and a fifth edge 414A.

The fifth edge 414A is an edge or a surface for positioning the blade 41 with respect to the supporting member 42 in the longer direction of the blade 41 and faces the first protrusion 421 in the longer direction of the blade 41. In other words, the fifth edge 414A constitutes a bottom of the U-shaped first opening A1. The fifth edge 414A includes a semicircular surface that coincides with one-half of a peripheral surface of the first protrusion 421. The first edge 414B and the second edge 414C extend along the longer direction of the blade 41 and parallel to each other from respective ends of the fifth edge 414A in a peripheral direction of the fifth edge 414A. The first edge 414B and the second edge 414C extend toward the first end 412 of the blade 41 in the longer direction of the blade 41. The "edge or surface extending along the longer direction of the blade unit 41" includes an edge or surface extending parallel to the longer direction of the blade unit 41 or an edge or surface extending obliquely with a ±3-degree slant due to tolerance.

The first edge 414B and the second edge 414C are edges or surfaces for positioning the blade 41 with respect to the supporting member 42 in the shorter direction of the blade 41. The first edge 414B and the second edge 414C face each other across the first protrusion 421 in the shorter direction of the blade 41 and extend contiguous with the first end 412 of the blade 41 in the longer direction of the blade 41. The first end 412 of the blade 41 is flush with a point 421A of a periphery of the first protrusion 421 in the longer direction of the blade 41. The point 421A of the periphery of the first protrusion 421 is a farthest point of the periphery of the first protrusion 421 from the second opening A2 in the longer direction of the blade 41.

As depicted in FIG. 3C, the second opening edge 415 has a U shape and defines the second opening A2 such that the second opening A2 is recessed relative to the second end 413 of the blade 41 in the longer direction of the blade 41. The second opening edge 415 includes a third edge 415B, a fourth edge 415C, and a sixth edge 415A. The sixth edge 415A is an edge or a surface that faces the second protrusion 422 in the longer direction of the blade 41. The sixth edge 415A constitutes a bottom of the U-shaped second opening A2. The sixth edge 415A includes a semicircular surface that coincides with one-half of a peripheral surface of the second protrusion 422. The third edge 415B and the fourth edge 415C extend along the longer direction of the blade 41 and parallel to each other from respective ends of the sixth edge 415A in a peripheral direction of the sixth edge 415A. The third edge 415B and the fourth edge 415C extend toward the second end 412 of the blade 41 in the longer direction of the blade 41.

The third edge 415B and the fourth edge 415C are edges or surfaces for positioning the blade 41 with respect to the supporting member 42 in the shorter direction of the blade 41. The third edge 415B and the fourth edge 415C face each other across the second protrusion 422 in the shorter direction of the blade 41 and extend contiguous with the second end 413 of the blade 41 that is opposite to the first end 412 of the blade 41 in the longer direction of the blade 41. The second end 413 of the blade 41 is flush with a point 422A of a periphery of the second protrusion 422 in the longer direction of the blade 41. The point 422A of the periphery of the second protrusion 422 is a farthest point of the periphery of the second protrusion 422 from the first opening A1 in the longer direction of the blade 41.

In a state where the blade 41 is welded to the supporting member 42, the minimum distance between the closest one of the edges of the first opening edge 414 to the center of the blade 41 (e.g., the fifth edge 414A) and the first protrusion 421 in the longer direction of the blade 41 is shorter than the minimum distance between the closest one of the edges of the second opening edge 415 to the center of the blade 41 (e.g., the sixth edge 415A) and the second protrusion 422 in the longer direction of the blade 41. The minimum distance between the closest one of the edges of the second opening edge 415 to the center of the blade 41 (e.g., the sixth edge 415A) and the second protrusion 422 in the longer direction of the blade 41 may be, for example, 0.2 to 1.0 mm.

Figure 4:
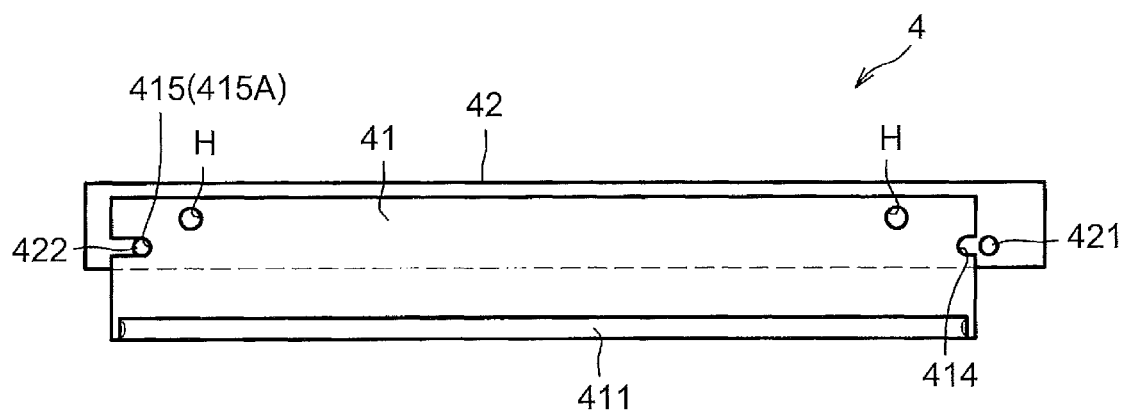
FIG. 4 illustrates a state where the blade is misoriented with respect to a supporting member in the illustrative embodiment according to one or more aspects of the disclosure.

More specifically, as depicted in FIG. 4, a cut depth of the second opening A2 is greater than a cut depth of the first opening A1, i.e., the second opening edge 415 is positioned closer to the center of the blade 41 than the first opening edge 414. With this configuration, if the entire portion of the second protrusion 422 in the diameter direction of the second protrusion 422 is positioned within the second opening A2 while the second protrusion 422 is in contact with or closer to the sixth edge 415A of the second opening edge 415, no portion of the first protrusion 421 in the diameter direction of the first protrusion 421 is positioned within the first opening A1. More specifically, the cut depth of the second opening A2 is greater than the cut depth of the first opening A1 by a diameter of the first protrusion 421. In other words, a dimension (e.g., a length) of the first edge 414B and the second edge 414C of the first opening edge 414 in the longer direction of the blade 41 is shorter than a dimension (e.g., a length) of the third edge 415B and the fourth edge 415C of the second opening edge 415.

With this configuration, if an operator mistakenly positions the entire portion of the second protrusion 422 of the supporting member 42 in the diameter direction of the second protrusion 422 within the second opening A2 of the blade 41 while the second protrusion 422 is in contact with or closer to the sixth edge 415A of the second opening edge 415 of the second opening A2, no portion of the first protrusion 421 of the supporting member 42 in the diameter direction of the first protrusion 421 is positioned within the first opening A1 of the blade 41, whereby the operator may become aware of mispositioning of the blade 41. Thus, the mispositioning of the blade 41 with respect to the supporting member 42 may be prevented or reduced.

In the illustrative embodiment, in a state where the entire portion of the second protrusion 422 of the supporting member 42 in the diameter direction of the second protrusion 422 is positioned within the second opening A2 of the blade 41 while the second protrusion 422 of the supporting member 42 is in contact with or closer to the sixth edge 415A of the second opening edge 415 of the blade 41, no portion of the first protrusion 421 in the diameter direction of the first protrusion 421 is positioned within the first opening A1. More specifically, in this state, the first opening edge 414 does not overlap the first protrusion 421 in the shorter direction of the blade 41. Nevertheless, in other embodiments, for example, in the same situation, a slight portion of the first protrusion 421 may be positioned within the first opening edge 414, i.e., a slight portion of the first opening edge 414 may overlap a portion of the first protrusion 421 in the shorter direction of the blade 41.

More specifically, in the configuration according to the illustrative embodiment in which the first end 412 and the second end 413 of the blade 41 are flush with the point 421A of the first protrusion 421 and the point 422A of the second protrusion 422, respectively, it may only be necessary that the cut depth of the second opening A2 is greater than the cut depth of the first opening A1 by at least a radius of the first protrusion 421, i.e., the second opening edge 415 is positioned closer to the center of the blade 41 than the first opening edge 414 by at least a radius of the first protrusion 421. In this case, also, if the operator mistakenly positions the entire portion of the second protrusion 422 of the supporting member 42 in the diameter direction of the second protrusion 422 within the second opening A2 while the second protrusion 422 is in contact with or closer to the sixth edge 415A of the second opening edge 415 of the blade 41, no portion of the first protrusion 421 of the supporting member 42 in the diameter direction of the first protrusion 421 is positioned within the first opening A1 of the blade 41 and thus the first opening edge 414 (e.g., the blade 41) is not fixed by the first protrusion 421, whereby the operator may become aware of mispositioning of the blade 41 with respect to the supporting member 42. Therefore, the mispositioning of the blade 41 with respect to the supporting member 42 may be prevented or reduced.

As depicted in FIG. 3A, the blade 41 is joined to the supporting member 42 by laser welding at a plurality of portions of the blade 41, including portions of the blade 41 between the first opening edge 414 and the second opening edge 415.

The blade 41 has a weld mark 43 which joins the blade 41 and the supporting member 42 at a position between the first opening edge 414 and the second opening edge 415. More specifically, the weld mark 43 is formed along an imaginary line extending parallel to the longer direction of the blade 41 and passing the first opening A1 and the second opening A2. In other words, the weld mark 43 is formed in line with the first opening edge 414 and the second opening edge 415 in the longer direction of the blade 41.

The weld mark 43 includes a plurality of weld marks (e.g., a first weld mark 43A and a second weld mark 43B) that are arranged along the longer direction of the blade 41. The weld mark 43 extends from a vicinity of the first opening edge 414 to a vicinity of the second opening edge 415. Each end of the weld mark 43 (e.g., each outermost weld mark of the weld mark 43 in the longer direction of the blade 41) is located, for example, 0.1 to 5.0 mm distant from a respective one of the first opening edge 414 and the second opening edge 415. In other embodiments, each end of the weld mark 43 may be located, for example, 0.1 to 4.0 mm, 0.5 to 3.0 mm, or 0.7 to 2.0 mm, distant from a respective one of the first opening edge 414 and the second opening edge 415.

Figure 5:
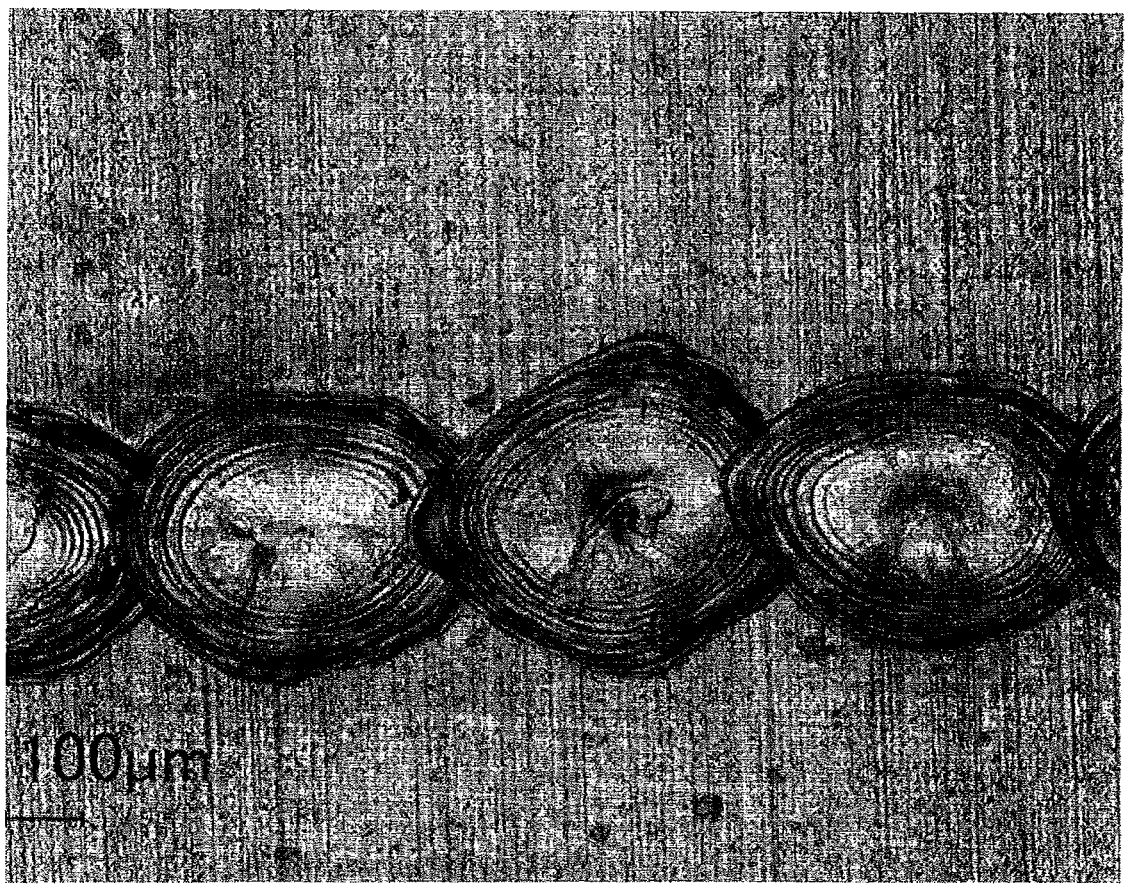
FIG. 5 illustrates a laser microscope image of a weld mark formed on the blade in the illustrative embodiment according to one or more aspects of the disclosure.

In the plurality of weld marks of the weld mark 43, for example, the second weld mark 43B is formed closer to the second opening A2 than the first weld mark 43A while partially overlapping on top of the first weld mark 43A. In other words, among the adjacent weld marks 43A and 43B, the second weld mark 43B, which is formed closer to the second opening A2, partially overlaps on top of a portion of the first weld mark 43A, which is formed closer to the first opening A1. In actual, the weld marks 43A and 43B are formed as depicted in FIG. 5.

Figure 18:
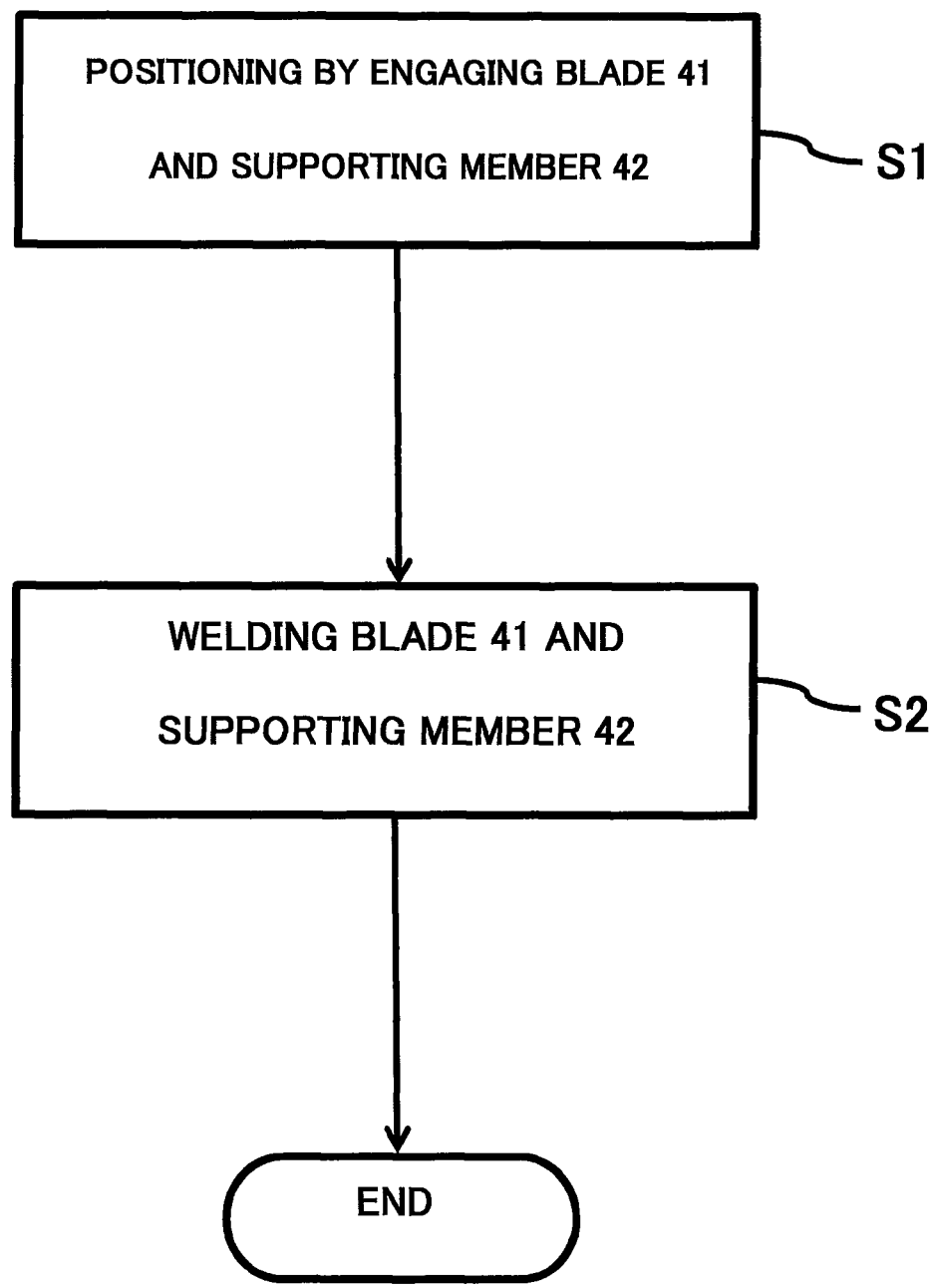
FIG. 18 is a flowchart depicting a method for manufacturing the developing device in the illustrative embodiment according to one or more aspects of the disclosure.

Hereinafter, a manufacturing method of the developing device 1 will be explained by reference to FIG. 18.

Figure 6A:
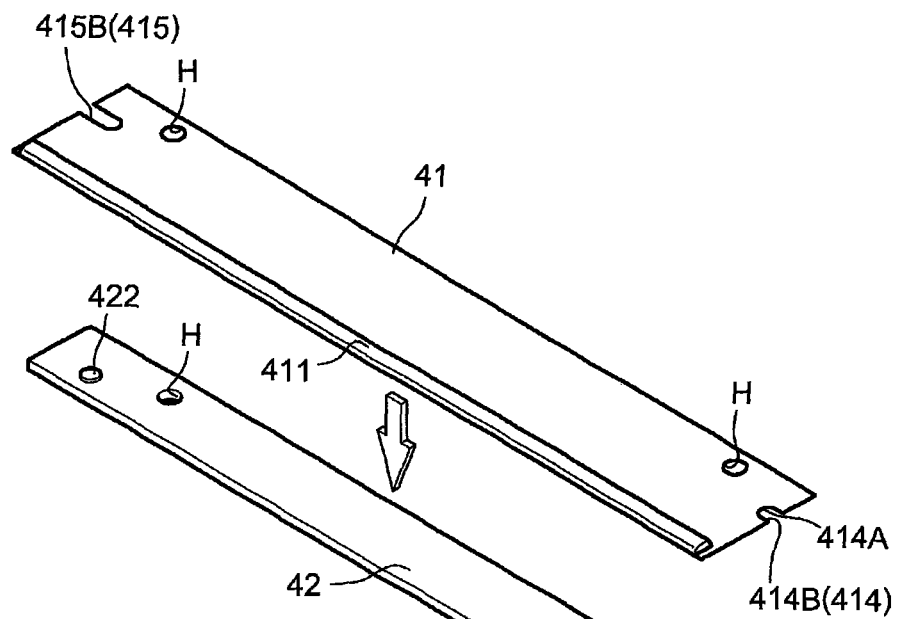
FIG. 6A is a diagram for explaining a positioning process in a blade unit assembling procedure in the illustrative embodiment according to one or more aspects of the disclosure.

Firstly, a positioning process S1 will be explained. As depicted in FIG. 6A, when assembling the blade unit 4 for manufacturing the developing device 1, the blade 41 is placed on the supporting member 42. At that time, the entire portion of the first protrusion 421 of the supporting member 42 in the diameter direction of the first protrusion 421 is positioned within the first opening A1 while the first protrusion 421 is in contact with or closer to the fifth edge 414A and the first edge 414B of the first opening edge 414 of the blade 41 and the entire portion of the second protrusion 422 of the supporting member 42 in the diameter direction of the second protrusion 422 is positioned within the second opening A2 while the second protrusion 422 of the supporting member 42 is in contact with or closer to the third edge 415B of the second opening edge 415 of the blade 41. Thus, one end portion (e.g., the first opening edge 414) of the blade 41 in the longer direction of the blade 41 is aligned with respect to both of the longer and shorter directions of the blade 41 and the other end portion (e.g., the second opening edge 415) is aligned with respect to the shorter direction of the blade 41 while being free with respect to the longer direction of the blade 41.

During the positioning process, if the operator mistakenly positions the entire portion of the second protrusion 422 of the supporting member 42 in the diameter direction of the second protrusion 422 within the second opening A1 of the blade 41 while the second protrusion 422 is in contact with or closer to the sixth edge 415A of the second opening edge 415 of the blade 41 as depicted in FIG. 4, no portion of the first protrusion 421 in the diameter direction of the first protrusions 421 is positioned within the first opening A1, whereby the operator may become aware of mispositioning of the blade 41 with respect to the supporting member 42. Thus, the mispositioning of the blade 41 with respect to the supporting member 42 may be prevented or reduced.

Figure 6B:
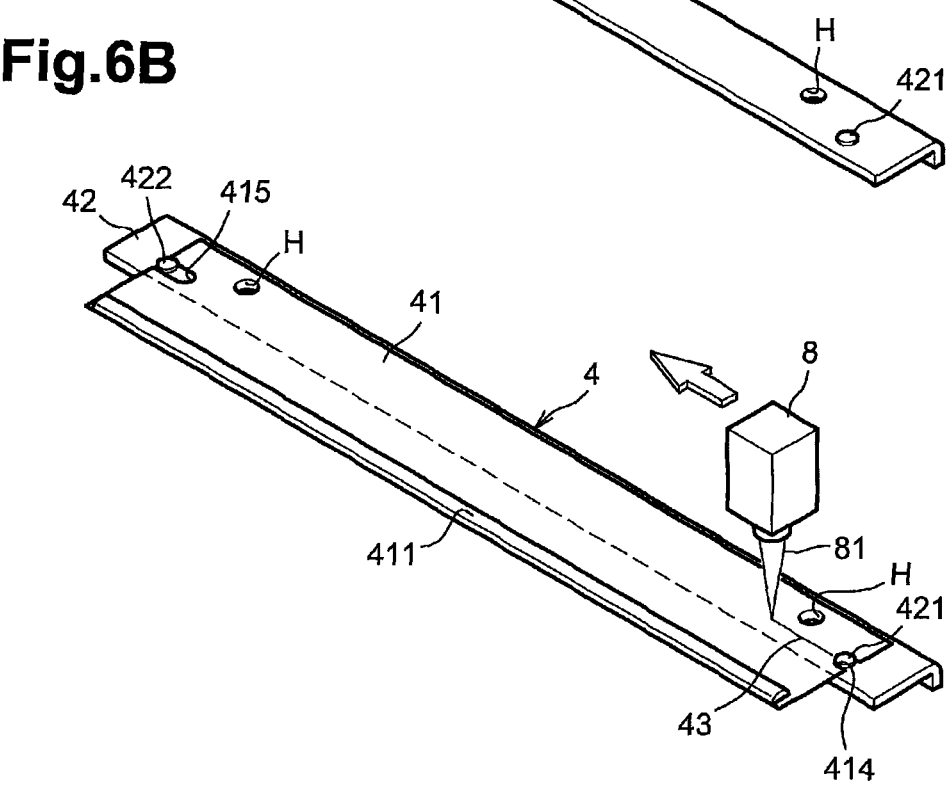
FIG. 6B is a diagram for explaining a welding process in the blade unit assembling procedure in the illustrative embodiment according to one or more aspects of the disclosure.

Secondly, a welding process S2 will be explained. The blade 41 and the supporting member 42 are fastened on a worktable using a jig. Thereafter, as depicted in FIG. 6B, while a laser beam 81 irradiated from a welding machine 8 is moved with respect to the blade 41, the laser beam 81 is irradiated onto the blade 41 to weld the blade 41 and the supporting member 42 to each other.

In the illustrative embodiment, the welding machine 8 is configured to irradiate a continuous wave laser intermittently in response to input of pulse signals as electrical signals. Nevertheless, in other embodiments, for example, another welding machine may be used that may be configured to irradiate the blade 41 with a laser beam by moving a reflector provided inside the welding machine, without moving the welding machine itself. For example, a fiber laser may be used as the continuous wave laser.

In the welding process, the laser beam 81 is moved with respect to the blade 41 along the longer direction of the blade 41 and along the imaginary line passing the first protrusion 421 and the second protrusion 422 from one end portion to the other end portion. That is, the blade 41 and the support member 42 are welded to each other at a portion of the blade 41 between the first opening edge 414 and the second opening edge 415 of the blade 41, starting the welding from the first opening edge 414 side to the second opening edge 415 side.

According to the above procedure, the blade 41, which is positioned on the supporting member 42 with respect to both the longer direction of the blade 41 and the shorter direction of the blade 41, is welded to the supporting member 42, starting the welding from the one end portion of the blade 41. Therefore, before the blade 41 thermally expands due to increase of the temperature of the blade 41, the one end portion of the blade 41 may be aligned appropriately with respect to both the longer direction of the blade 41 and the shorter direction of the blade 41. The blade 41 is welded to the supporting member 42 starting the welding from a vicinity of the first opening edge 414 to a vicinity of the second opening edge 415 that defines the second opening A2 that is cut deeper than the first opening A1 (e.g., a portion that is not aligned with respect to the longer direction of the blade 41). This procedure may allow the second opening A2 to absorb thermal expansion of the blade 41 that may occur during welding. Therefore, even if a thermal expansion occurs, deformation of the blade 41 that may be caused due to contact of the sixth edge 415A (e.g., a bottom) of the second opening edge 415 to the second protrusion 422 may be reduced.

As described above, a laser beam is irradiated onto the blade 41 from the first opening edge 414 side to the second opening edge 415 side intermittently. Therefore, as depicted in FIG. 3C, the second weld mark 43B, which is located closer to the second opening edge 415 than the first weld mark 43A, partially overlaps on top of the first weld mark 43A, which is located closer to the first opening edge 414 than the second weld mark 43B.

According to the illustrative embodiment, effects described below may also be obtained as well as the above-described effects.

The blade 41 is positioned with respect to the supporting member 42 while the first end 412 and the second end 413 of the blade 41 are flush with the point 421A and the point 422A of the first protrusion 421 and the second protrusion 422, respectively. Therefore, for example, the dimension of the blade 41 in the longer direction of the blade 41 may be shortened as compared with a configuration in which the first end 412 and the second end 413 of the blade 41 in the longer direction of the blade 41 protrude relative to the point 421A and the point 422A of the first protrusion 421 and the second protrusion 422 for positioning, respectively.

The first edge 414B and the second edge 414C extend to the first end 412 of the blade 41 and the third edge 415B and the fourth edge 415C extend to the second end 413 of the blade 41. With this configuration, the first end 412 and the second end 413 of the blade 41 may be positioned adjacent to the first protrusion 421 and the second protrusion 422, respectively, of the supporting member 42. Therefore, the dimension of the blade 41 in the longer direction of the blade 41 may be shortened as compared with a configuration, for example, in which one of the first edge and the third edge extends to the end of the blade and the other of the first edge and the third edge does not extend to the end of the blade (e.g., the other of the first edge and the third edge may define a hole as an opening).

The first opening edge 414 and the second opening edge 415 have a U shape and defines the first opening A1 and the second opening A2, respectively, such that the first opening A1 and the second opening A2 are recessed relative to the first end 412 and the second end 413, respectively, of the blade 41, in the longer direction of the blade 41. Therefore, after the entire portions of the first protrusion 421 and the second protrusion 422 in their diameter direction are positioned within the first opening A1 and the second opening A2 of the blade 41, respectively, while the first protrusion 421 and the second protrusion 422 are in contact with or closer to the first opening edge 414 and the second opening edge 413, respectively, it may be difficult to move the blade 41 in the shorter direction of the blade 41 with respect to the supporting member 42 even if force acts on the blade 41 in the shorter direction. Accordingly, the blade 41 may be positioned with respect to the supporting member 42 in the shorter direction of the blade 41 easily.

The weld mark 43 is formed on the blade 41 between the first opening A1 and the second opening A2, more specifically, the weld mark 43 is formed on the blade 41 along the imaginary line that passes the first opening A1 and the second opening A2 and extends parallel to the longer direction of the blade 41. Therefore, even if the blade 41 is deformed, the first protrusion 421 and the second protrusion 422 might not move away from the first opening A1 and the second opening A2, respectively. Accordingly, the blade 41 may be fixed onto the supporting member 42 appropriately.

While the disclosure has been described in detail with reference to example embodiments thereof, it is not limited to such examples. Various changes, arrangements and modifications may be applied to the detailed configuration without departing from the spirit and scope of the disclosure. In the description below, common parts have the same reference numerals as those of the above-described embodiments, and the detailed description of the common parts is omitted.

Figure 7:
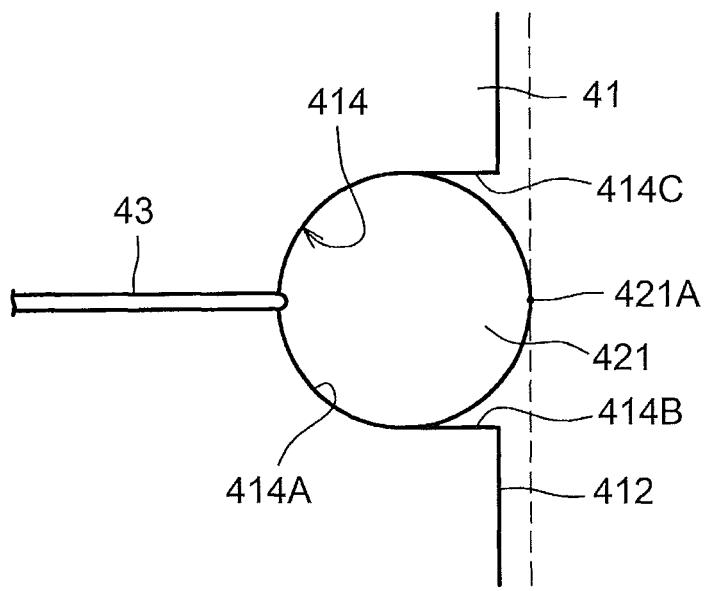
FIG. 7 is an enlarged view of a first opening defined in a blade in a first variation according to one or more aspects of the disclosure.

In the illustrative embodiment, the blade 41 is positioned with respect to the supporting member 42 while the first end 412 of the blade 41 is flush with the point 421A of the first protrusion 421 in the longer direction of the blade 41. Nevertheless, in other embodiments, for example, as depicted in FIG. 7, the first end 412 of the blade 41 may be located closer to the center of the blade 41 in the longer direction of the blade 41 than the point 421A of the first protrusion 421. This configuration may shorten the dimension (e.g., the length) of the blade 41 in the longer direction of the blade 41. The second end 413 of the blade 41 may be configured in a similar manner.

In the illustrative embodiment, the blade 41 is positioned with respect to the supporting member 42 while the first end 412 and the second end 413 of the blade 41 are flush with the point 421A and the point 422A, respectively, of the first protrusion 421 and the second protrusion 422 in the longer direction of the blade 41. Nevertheless, in other embodiments, for example, the blade 41 may be positioned with respect to the supporting member 42 while the first end 412 of the blade 41 may be flush with the point 421A of the first protrusion 421 and the second end 413 of the blade may be located closer to the center of the blade 41 than the point 422A of the second protrusion 422 in the longer direction of the blade 41.

[First Variation]

In the illustrative embodiment, the weld mark 43 is formed on the blade 41 without contacting the first opening edge 414. Nevertheless, in other embodiments, for example, as depicted in FIG. 7, the weld mark 43 may be formed on the blade 41 in contact with the first opening edge 414. The weld mark 43 may also be formed on the blade 41 in contact with the second opening edge 415 in a similar manner.

[Second Variation]

Figure 8:
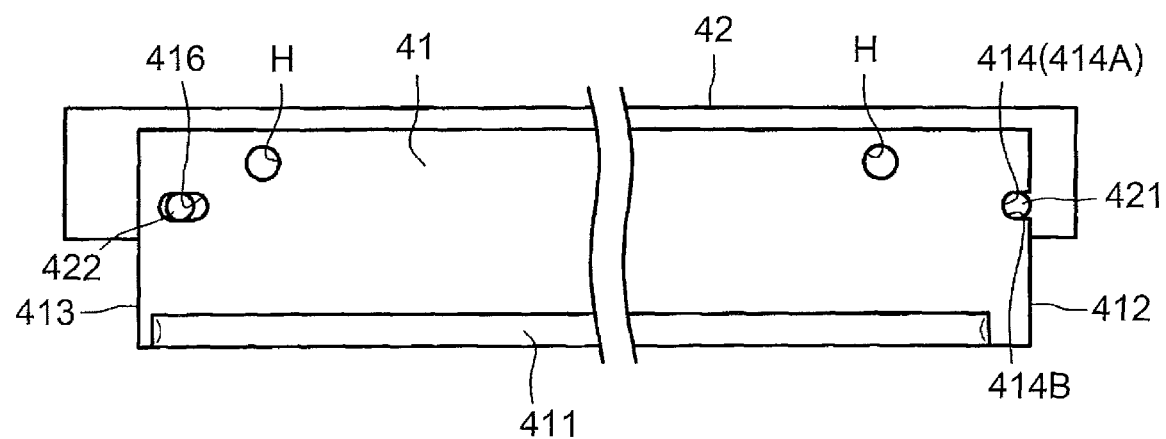
FIG. 8 illustrates a blade unit in a second variation according to one or more aspects of the disclosure.

In the illustrative embodiment, the first opening edge 414 and the second opening edge 415 of the blade 41 define the U-shaped first opening A1 and the U-shaped second opening A2, respectively. Nevertheless, in other embodiments, for example, as depicted in FIG. 8, the first opening edge 414 may define a U-shaped opening in a similar manner to the illustrative embodiment and the second opening edge 416 may define an elongated hole through which the second protrusion 422 passes. In this case, also, when the blade 41 is welded to the supporting member 42, starting the welding from the first opening edge 414 side to the second opening edge 416 side, the same effects as those obtained by the illustrative embodiment may be obtained.

[Third Variation]

Figure 9:
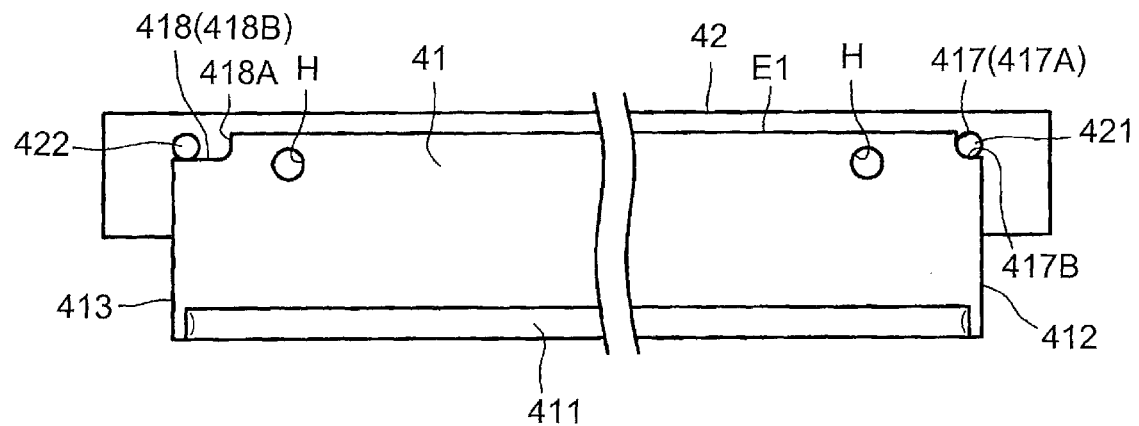
FIG. 9 illustrates a blade unit in a third variation according to one or more aspects of the disclosure.

As depicted in FIG. 9, in other embodiments, for example, the first opening edge 417 and the second opening edge 418 may define the first opening A1 and the second opening A2 such that the first opening A1 and the second opening A2 may be recessed relative to the first end 412 and the second end 413, respectively, in the longer direction of the blade 41 while the first opening A1 and the second opening A2 are recessed relative to one of ends extending along the longer side of the blade 41 in the shorter direction of the blade 41. In other words, the first opening edge 417 may include a fifth edge 417A and a first edge 417B. The fifth edge 417A may extend to a third end E1 of the blade 41 in the shorter direction of the blade 41. The first edge 417B may extend to the first end 412 of the blade 41 in the longer direction of the blade 41. The second opening edge 418 may include a sixth edge 418A and a third edge 418B. The sixth edge 418A may extend to the third end E1 of the blade 41 in the shorter direction of the blade 41. The third edge 418B may extend to the second end 413 of the blade 41 in the longer direction of the blade 41. In this case, the blade unit 4 is fastened to the worktable using the jig strongly while the fifth edge 417A and the first edge 417B of the blade 41 may be pressed against the first protrusion 421 of the supporting member 42 and the third edge 418B of the blade 41 may be pressed against the second protrusion 422 of the supporting member 42. Thereafter, the blade 41 and the supporting member 42 may be joined to each other by laser welding, starting the welding from the first opening edge 417 side to the second opening edge 418 side. In the blade unit 4 assembled in the above-described procedure, the fifth edge 417A and the first edge 417B of the first opening edge 417 of the blade 41 may be in contact with the first protrusion 421 of the supporting member 42 and the third edge 418B of second opening edge 418 of the blade 41 may be in contact with the second protrusion 422 of the supporting member 42.

[Fourth Variation]

Figure 10A:
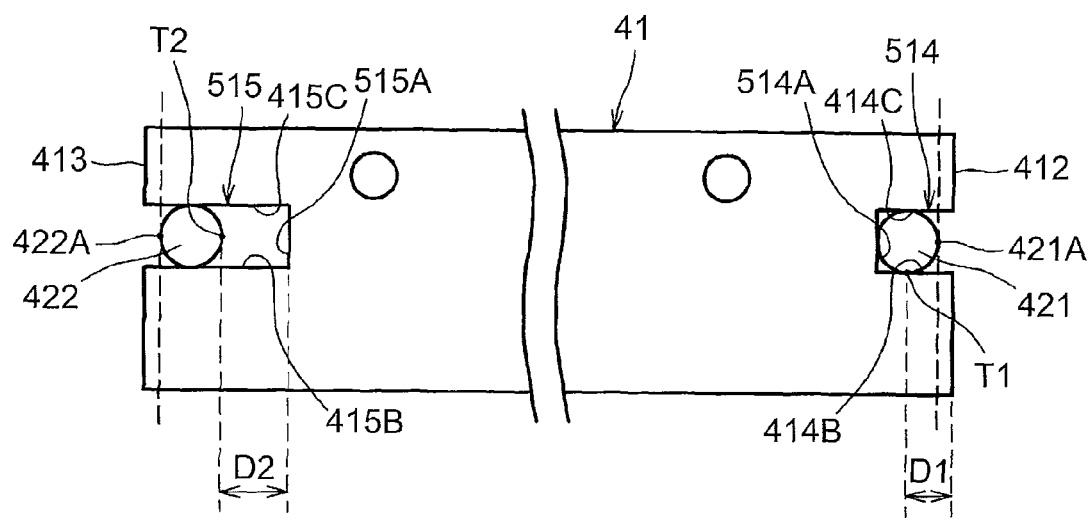
FIG. 10A illustrates a blade unit in a fourth variation according to one or more aspects of the disclosure.

In the illustrative embodiment, the bottom of the first opening A1 (e.g., the fifth edge 414A) and the bottom of the second opening A2 (e.g., the sixth edge 415A) extends curvedly in plan view. Nevertheless, in other embodiments, for example, as depicted in FIG. 10A, the bottom of the first opening A1 (e.g., the fifth edge 414A) and the bottom of the second opening A2 (e.g., the sixth edge 415A) may extend linearly perpendicular to the longer direction of the blade 41. More specifically, the first opening edge 514 may include the straight fifth edge 514A, and the first edge 414B and the second edge 414C. Similar to the illustrative embodiment, the first edge 414B and the second edge 414C may extend to the first end 412 of the blade 41 from respective ends of the fifth edge 514A in the shorter direction of the blade 41. The second opening edge 515 may include the straight sixth edge 515A, and the third edge 415B and the fourth edge 415C. Similar to the illustrative embodiment, the third edge 415B and the fourth edge 415C may extend to the second end 413 of the blade 41 from respective ends of the sixth edge 515A in the shorter direction of the blade 41. In this case, also, when the blade 41 is welded to the supporting member 42, starting the welding from the first opening edge 414 side to the second opening edge 416 side, the same effects as those obtained by the illustrative embodiment may be obtained.

As depicted in FIG. 10A, the first end 412 and the second end 413 of the blade 41 may be located slightly farther from the center of the blade 41 in the longer direction of the blade 41 than the point 421A of the first protrusion 421 and the point 422A of the second protrusion 422, respectively. For example, if a positioning hole is formed in an end portion of the blade 41, a portion having an appropriate width for ensuring rigidity may need to be left at the end portion of the blade 41, closer to the end of the blade in the longer direction of the blade 41. Therefore, the dimension (e.g., the length) of the blade in the longer direction of the blade 41 may be shortened even when the first end 412 and the second end 413 of the blade 41 are located slightly farther from the center of the blade 41 in the longer direction of the blade 41 than the point 421A of the first protrusion 421 and the point 422A of the second protrusion 422, respectively as compared with a case where the blade 41 has positioning holes therein.

Figure 10B:
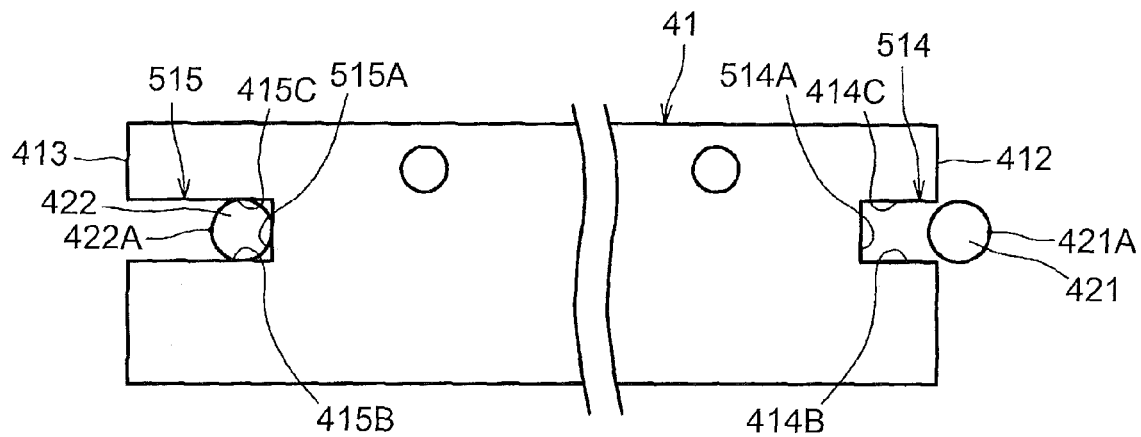
FIG. 10B illustrates the blade unit in the fourth variation according to one or more aspects of the disclosure.

In the example embodiment of FIG. 10A, in a state where the entire portion of the first protrusion 421 in the diameter direction of the first protrusion 421 is positioned within the first opening A1 while the first protrusion 421 is in contact with or closer to the fifth edge 514A of the first opening edge 514, a distance D2 between a point T2 of the second protrusion 422 and the sixth edge 515A is greater than a distance D1 between a point T1 of the first protrusion 421 and the first end 412 of the blade 41. The point T1 of the first protrusion 421 is a point of the first protrusion 421 closest to the first edge 414B (e.g., a point of the periphery of the first protrusion 421 closest to the first edge 414B and closest to the center of the blade 41 in the longer direction of the blade 41). The point T2 of the second protrusion 422 is a point of the periphery of the second protrusion 422 closest to the first opening edge 514 in the longer direction of the blade 41. With this configuration, as depicted in FIG. 10B, if the operator mistakenly positions the entire portion of the second protrusion 422 in the diameter direction of the second protrusion 422 within the second opening A2 while the second protrusion 422 is in contact with or closer to the sixth edge 515A of the second opening edge 515, a most portion of the first protrusion 421 in the diameter direction of the first protrusion 421 is positioned out of the first opening A1, whereby the operator may become aware of mispositioning of the blade 41 with respect to the supporting member 42. Thus, the mispositioning of the blade 41 with respect to the supporting member 42 may be prevented or reduced.

In the illustrative embodiment, in the welding process, the laser beam 81 is moved with respect to the blade 41. Nevertheless, the manner of moving the laser beam 81 with respect to the blade 41 is not limited to that example. In other embodiments, for example, the blade 41 and the supporting member 42 may be moved with respect to the laser beam 81 to move the laser beam 81 with respect to the blade 41 (or the blade 41 may be moved with respect to the laser beam 81).

In still other embodiments, the laser beam 81 and the set of the blade 41 and the supporting member 42 may be moved at the same time.

[Fifth Variation]

Figure 11:
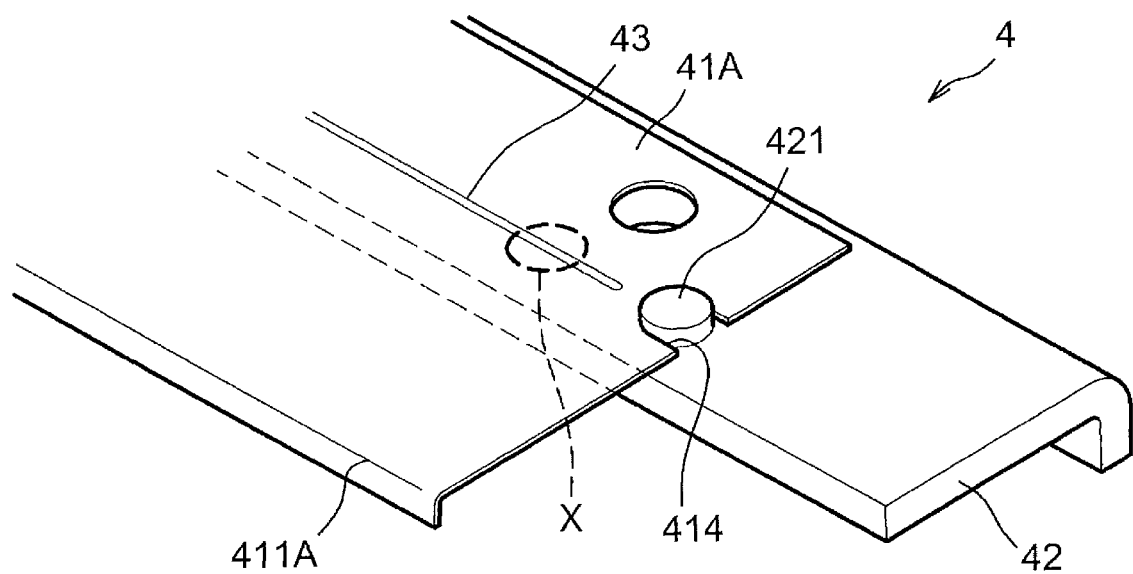
FIG. 11 illustrates a blade unit in a fifth variation according to one or more aspects of the disclosure.

In the illustrative embodiment, the blade 41 includes the contact portion 411 protruding from the blade 41. Nevertheless, the configuration of the blade 41 is not limited to that example. In other embodiments, for example, as depicted in FIG. 11, the blade 41A might not include a contact portion made of, for example, rubber, but may include a bent portion 411A in which the distal end portion of the blade may be bent toward the supporting member 42 (e.g., toward a side opposite to the developing roller 2). The bent portion 411A (e.g., the distal end of the blade 41) may directly contact the roller body 2A of the developing roller 2.

[Sixth Variation]

Figure 12:
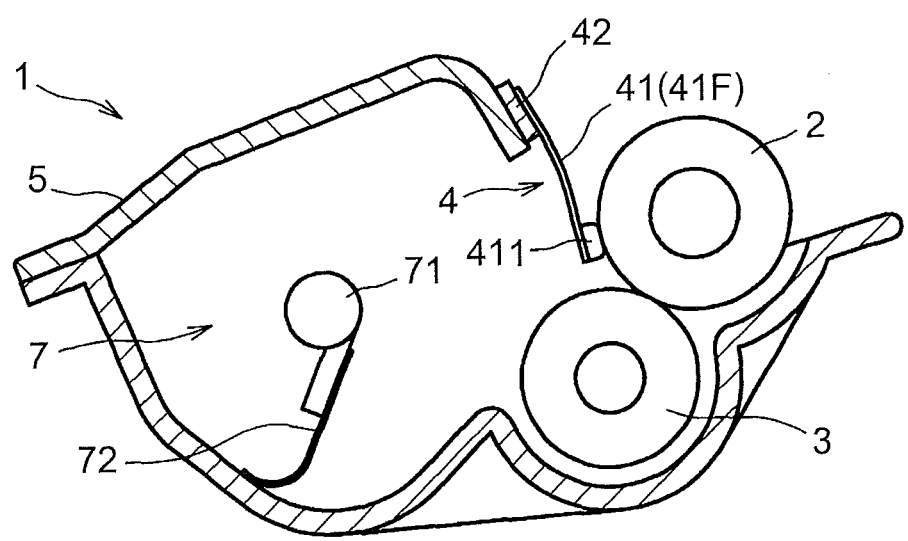
FIG. 12 is a sectional view depicting a developing device in a sixth variation according to one or more aspects of the disclosure.

In the illustrative embodiment, the distal end portion of the blade 41 is placed on the developing roller 2, and the blade 41 is pinched by the supporting member 42 and the developing case 5. Nevertheless, the configuration of the blade unit 4 is not limited to that example. In other embodiments, for example, as depicted in FIG. 12, the supporting member 42 to which the blade 41 may be welded may be fixed to the developing case 5 directly while the supporting member 42 is pinched by the blade 41 and the developing case 5. In the blade unit 4, the distal end portion of the blade 41 (e.g., the contact portion 411) may contact the developing roller 2 from the conveyor member 7 side. Further, a surface, which may be opposite to the surface 41F having the contact portion 411 thereon, of the blade 41 may be supported by the supporting member 42.

[Seventh Variation]

Figure 13:
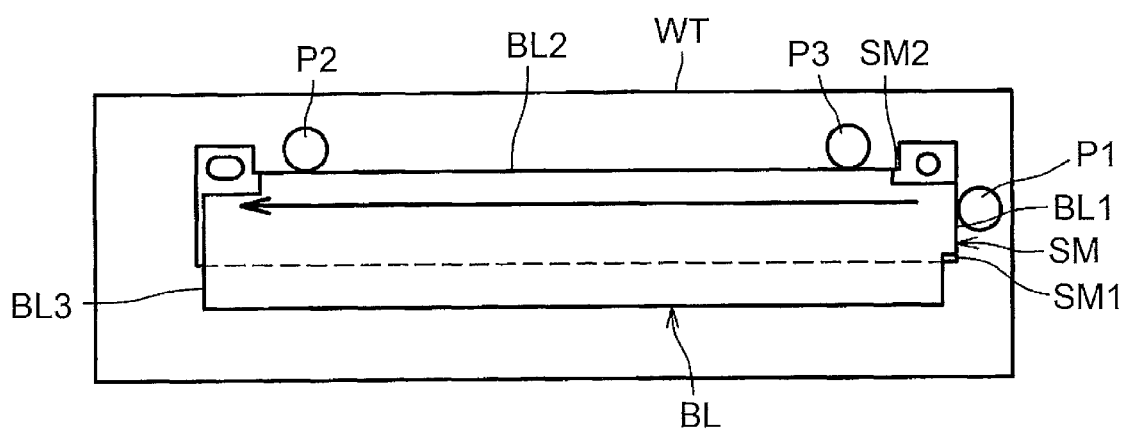
FIG. 13 illustrates a blade unit for explaining an assembling procedure of the blade unit in a seventh variation according to one or more aspects of the disclosure.

In the illustrative embodiment, the blade 41 has the first opening A1 and the second opening A2, and the supporting member 42 includes the first protrusion 421 and the second protrusion 422, for positioning relative to each other. Nevertheless, in other embodiments, for example, as depicted in FIG. 13, the worktable WT used in the welding process may include a first positioning pin P1, a second positioning pin P2, and a third positioning pin P3 while any configuration for positioning a blade BL and a supporting member SM with respect to each other is not provided to the blade BL and the supporting member SM.

More specifically, the first positioning pin P1 and the third positioning pin P3 may be used for positioning one end portion of the blade BL with respect to the supporting member SM along the longer direction of the blade BL and the shorter direction of the blade BL. The second positioning pin P2 may be used for positioning the other end portion of the blade BL in the longer direction of the blade 41 with respect to the supporting member SM along the shorter direction of the blade 41 while not positioning the other end portion of the blade BL with respect to the supporting member SM along the longer direction of the blade 41.

The first positioning pin P1 may be disposed so as to engage with a first end BL1 of the blade BL in the longer direction of the blade BL and a first end SM1 of the supporting member SM in the longer direction of the supporting member SM. The third positioning pin P3 may be disposed so as to engage with a portion of a second end BL2 of the blade BL in the shorter direction of the blade 41 and a portion of a second end SM2 of the supporting member SM in the shorter direction of the blade 41.

The second positioning pin P2 may be disposed so as to engage another portion of the second blade BL2 of the blade BL in the shorter direction of the blade 41 and another portion of the second end SM2 of the supporting member SM in the shorter direction of the blade 41. In this case, also, when the blade BL is welded to the supporting member SM, starting the welding from the first end BL1 side to the second end BL3 side, the same effects as those obtained by the illustrative embodiment may be obtained.

[Eighth Variation]

Figure 14:
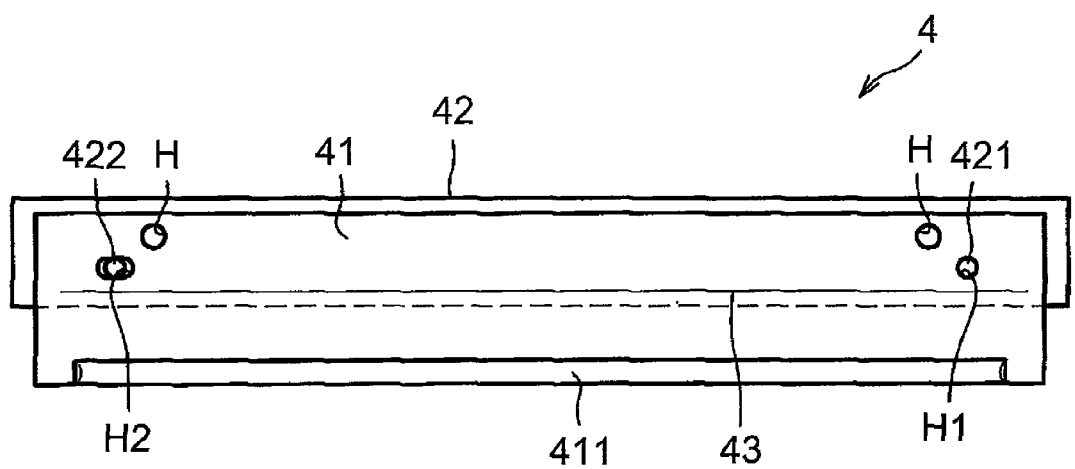
FIG. 14 illustrates a blade unit in an eighth variation according to one or more aspects of the disclosure.

In the illustrative embodiment, the first opening edge 414 and the second opening edge 415 define the U-shaped openings. Nevertheless, in other embodiments, for example, as depicted in FIG. 14, a first opening edge may define a first circular hole H1 and a second opening edge may define a second elongated hole H2. As depicted in FIG. 14, the weld mark 43 may be formed on the blade 41 at a position closer to the contact portion 411 (e.g., the developing roller 2) in the shorter direction of the blade 41 than the first hole H1 and the second hole H2. Therefore, this configuration may prevent or reduce removal of the first protrusion 421 and the second protrusion 422 from the first hole H1 and the second hole H2, respectively, when the blade 41 is bend.

In the illustrative embodiment, the developing roller 2 including the roller body 2A and the shaft 2B is illustrated as the developer carrier. Nevertheless, in other embodiments, for example, the developer carrier is not limited to that example. In other embodiments, for example, a brush roller, a developing sleeve, or a belt-shaped developer carrier may be used as the developer carrier.

In the illustrative embodiment, the contact portion 411 (e.g., the distal end) of the blade 41 is in direct contact with the roller body 2A of the developing roller 2 (as an example of the developer carrier). Nevertheless, the configuration of the blade is not limited to that example. In other embodiments, for example, the blade may be disposed such that its distal end portion may be substantially 0.1 to 1.0 mm apart from the roller body 2A.

In the illustrative embodiment, the stainless steel is used as the metallic material for the blade 41. Nevertheless, the material of the blade 41 is not limited to that example. For example, the blade 41 may be made of, for example, steel used for springs, phosphor bronze, beryllium copper, or carbon tool steel. In a case where the steel for springs or the carbon tool steel is adopted, a nickel, chromium, or zinc coating may be applied to the blade 41 for rustproof.

In the illustrative embodiment, the electrolytic zinc-coated carbon steel sheet may be used as the metallic material for the supporting member 42. Nevertheless, the configuration of the supporting member 42 is not limited to that example. In other embodiments, for example, the supporting member 42 may be made of a cold rolled steel plate or a tin plate, or a plate made of one of the cold rolled steel plate and the tin plate whose surface may be applied with treatment such as Parkerizing, chromating, or nickel coating. The supporting member 42 may also have a coating including press oil thereon.

In the illustrative embodiment, the welding machine 8 irradiates the continuous laser onto the blade 41 intermittently. Nevertheless, in other embodiments, for example, a pulsed laser may be used instead of the continuous laser. In still other embodiments, the welding machine 8 may irradiate the continuous laser onto the blade 41 continuously.

Figure 15:
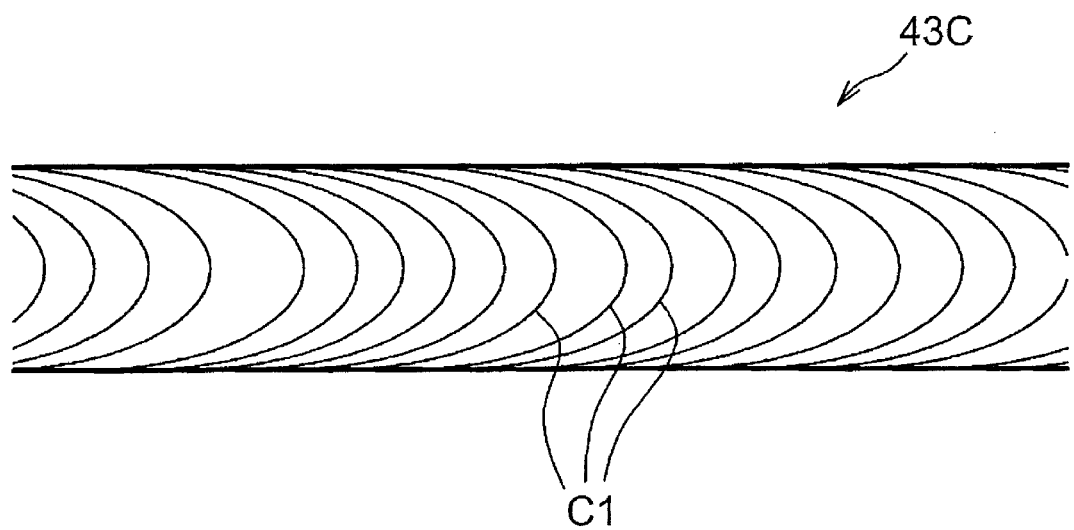
FIG. 15 simply illustrates a weld mark pattern formed on a blade in another variation according to one or more aspects of the disclosure.

In a case where a laser beam is irradiated continuously, for example, a weld mark 43C having a pattern of FIG. 15 may be formed on the blade 41. FIG. 15 is an enlarged view depicting a portion X of FIG. 11. That is, the first protrusion 421 is disposed to the right of the weld mark 43C and the second protrusion 422 is disposed to the left of the weld mark 43C.

Figure 16:
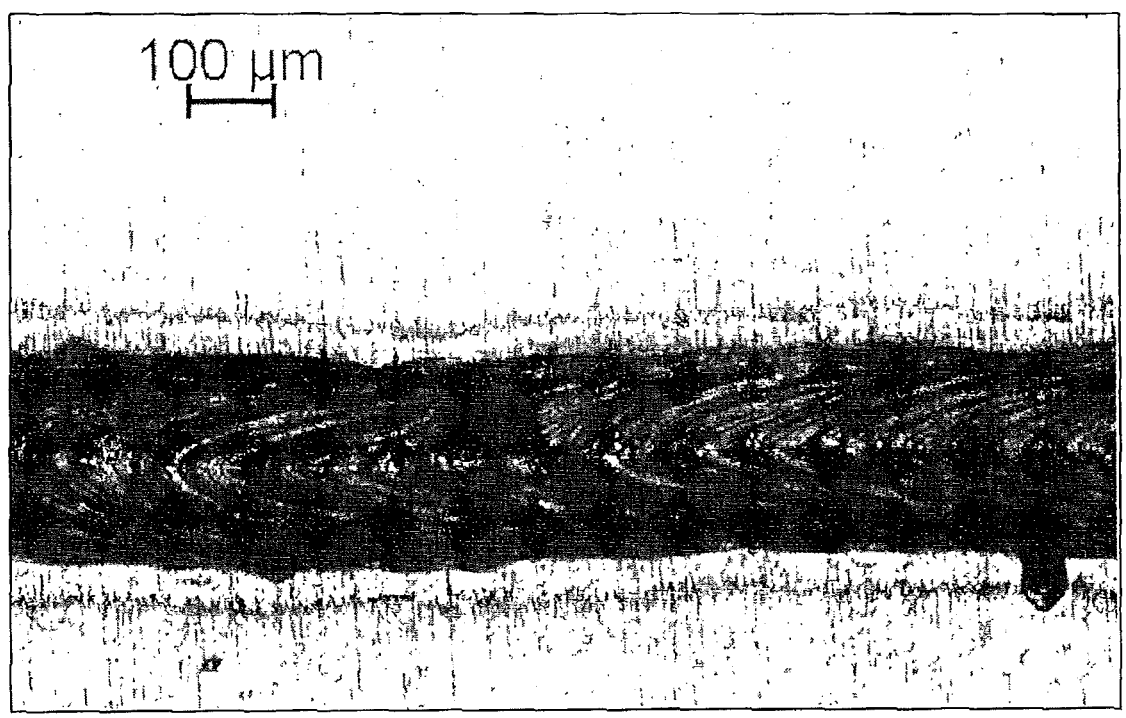
FIG. 16 illustrates a laser microscope image of the weld mark pattern of FIG. 15 formed on the blade in the other variation according to one or more aspects of the disclosure.

The weld mark 43C extends linearly along the longer direction of the blade 41. The weld mark 43C has a pattern C1 having a plurality of arc-shaped protrusions, each of which protrudes toward the first protrusion 421 (disposed to the right of the weld mark 43). In actual, the plurality of weld marks of the weld mark 43C may be formed as depicted in FIG. 16. In FIG. 16, the orientation of the blade 41 is reversed to the orientation of the blade 41 depicted in FIG. 15. That is, the first protrusion 421 is located to the left of the weld mark 43 and the second protrusion 422 is located to the right of the weld mark 43.

[Ninth Variation]

Figure 17:
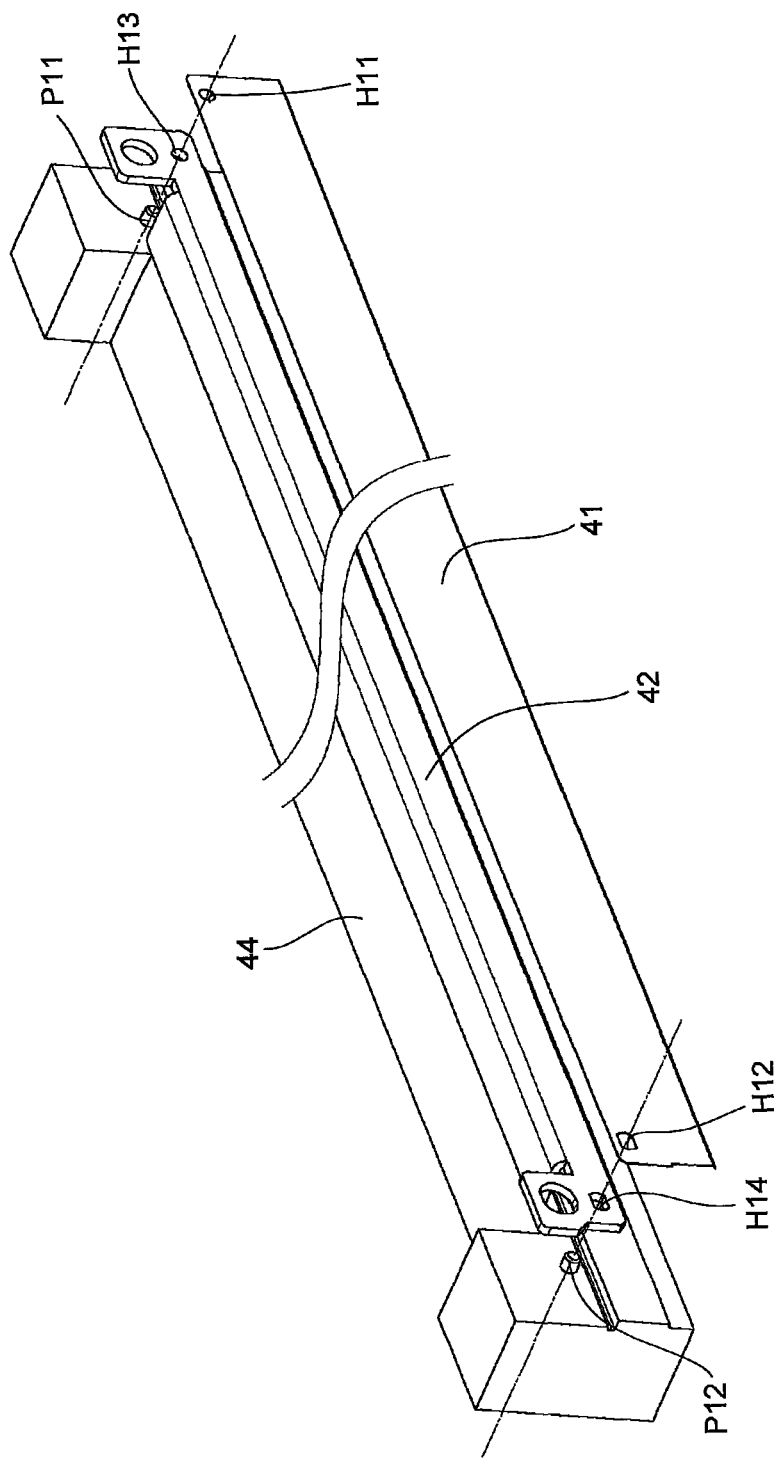
FIG. 17 is a diagram for explaining a positioning process in the blade unit assembling procedure in a ninth variation according to one or more aspects of the disclosure.
Figure 19:
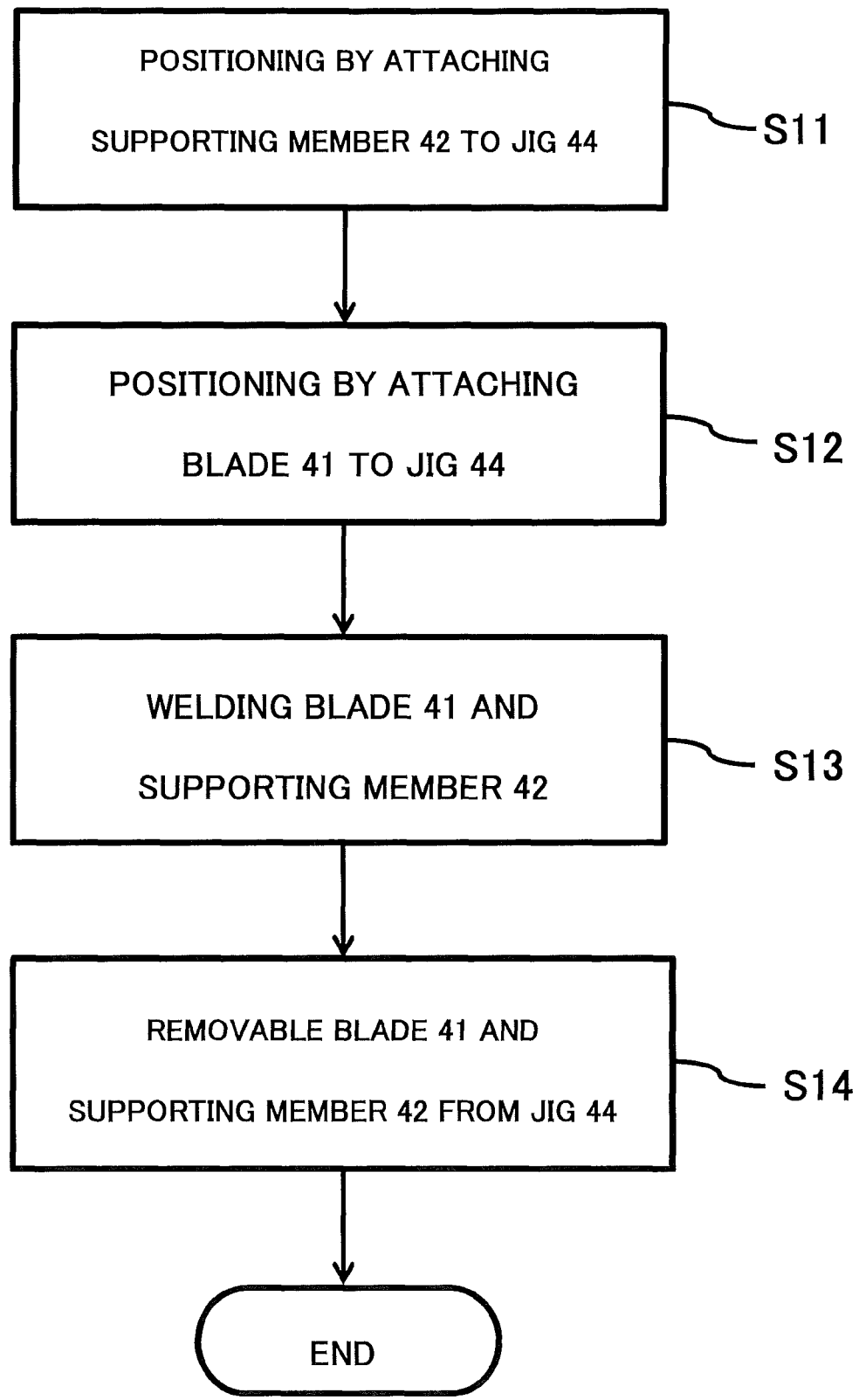
FIG. 19 is a flowchart depicting a method for manufacturing the developing device in the ninth variation according to one or more aspects of the disclosure.

In the illustrative embodiment, in the positioning process of the blade 41 and the supporting member 42, the blade 41 is positioned with respect to the supporting member 42. Nevertheless, in other embodiments, for example, the blade 41 and the supporting member 42 may be positioned by using a jig. As depicted in FIG. 17, the blade 41 may have a circular hole H11 and an elongate hole H12, the supporting member 42 may have a circular hole H13 and an elongate hole H14, and the jig 44 may have a first protrusion P11 configured to be insertable into the circular holes H11 and H13, and a second protrusion P12 configured to be insertable into the elongate holes H12 and H14. In this case, as depicted in FIG. 19, the supporting member 42 may be positioned with respect to the jig by attaching the supporting member 42 to the jig 44 (S11), and then the blade 41 may be positioned with respect to the jig 44 by attaching the blade 41 to the jig 44 (S12). Thus, the first end portion of the blade 41 may be relatively positioned with respect to the supporting member 42 in the longer direction and the shorter direction, and the second end portion of the blade 42 may be relatively positioned with respect to the supporting member 42 in the shorter direction. In the welding process (S13), the blade 41 and the supporting member 42 may be welded by moving the laser beam relative to the blade from a first end portion side of the blade toward a second end portion side of the blade, as the above-described welding process (S2). The jig 44 may be removed from the blade 41 and the supporting member 42 (S14) after the welding process (S13).

[Tenth Variation]

Figure 20:
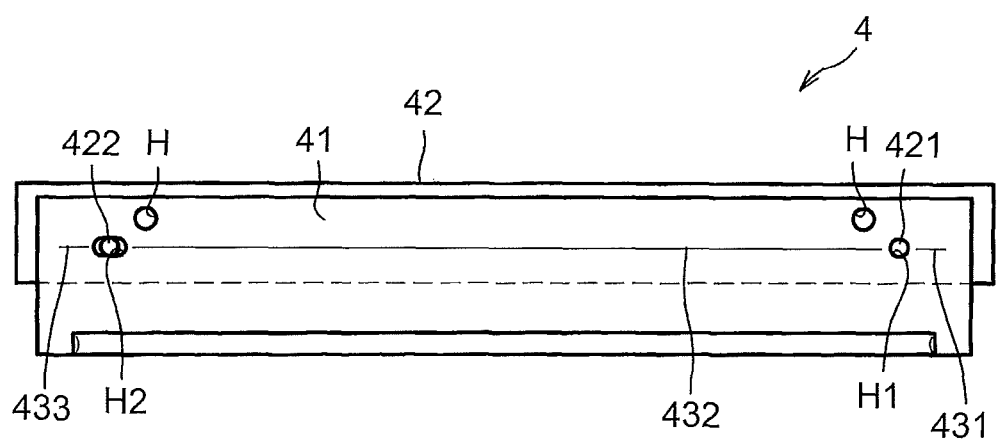
FIG. 20 illustrates a blade unit in a tenth variation according to one or more aspects of the disclosure.

In the illustrative embodiment, in the welding process, the blade 41 and the supporting member 42 are welded by irradiating the laser beam relative to only a portion of the blade 41 between the first hole H1 and the second hole H2, as depicted in FIG. 14. Nevertheless, in other embodiments, for example, as depicted in FIG. 20, the laser beam may be irradiated relative to a portion of the blade 41 between a first end 412 of the first end portion in the longer direction and the first hole H1, and a portion of the blade 41 between a second end 413 of the second end portion in the longer direction and the second hole H2. In this case, weld mark 431 may be formed on the portion of the blade 41 between the first end 412 of the first end portion in the longer direction and the first hole H1, weld mark 432 may be formed on a portion of the blade 41 between the first hole H1 and the second hole H2, and weld mark 433 may be formed on the portion between the second end 413 of the second end portion in the longer direction and the second hole H2. The laser beam may be irradiated relative to the blade 41 from the first end portion side of the blade 41 toward the second end portion side of the blade 41, and the weld marks may be formed in order of the weld marks 431, the weld mark 432 and the weld mark 433.

[Eleventh Variation]

Figure 21:
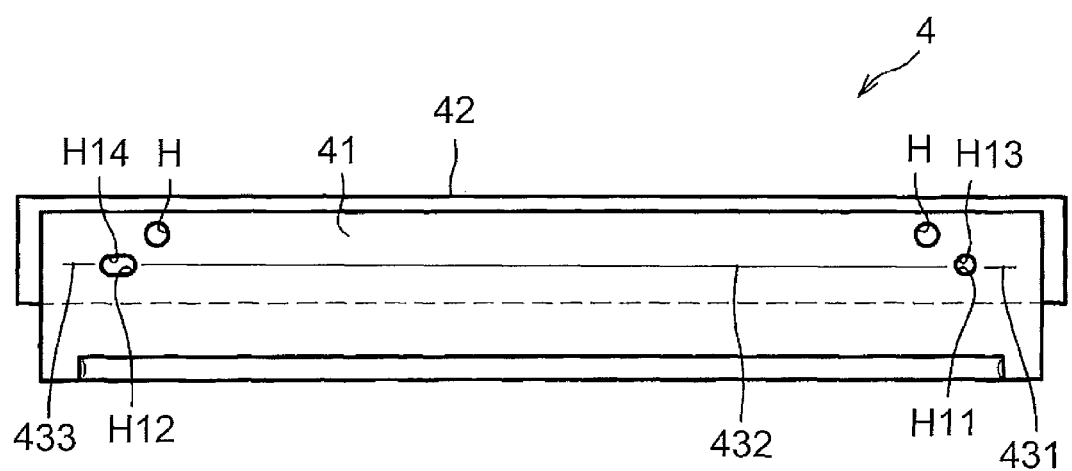
FIG. 21 illustrates a blade unit in an eleventh variation according to one or more aspects of the disclosure.

In other embodiments, in which the blade 41 and the supporting member 42 are positioned by using a jig 44, it may be similar to the Tenth variation. For example, as depicted in FIG. 21, the laser beam may be irradiated relative to a portion of the blade 41 between a first end 412 of the first end portion in the longer direction and the circular hole H11, and a portion of the blade 41 between a second end 413 of the second end portion in the longer direction and the elongate hole H12. In this case, weld mark 431 may be formed on the portion of the blade 41 between the first end 412 of the first end portion in the longer direction and the circular hole H11, weld mark 432 may be formed on a portion of the blade 41 between the circular hole H11 and the elongate hole H12, and weld mark 433 may be formed on the portion between the second end 413 of the second end portion in the longer direction and the elongate hole H12. The laser beam may be irradiated relative to the blade 41 from the first end portion side of the blade 41 toward the second end portion side of the blade 41, and the weld marks may be formed in order of the weld marks 431, the weld mark 432 and the weld mark 433.

What is claimed is:

1. A method for manufacturing a developing device, the developing device comprising: a developer carrier having a rotation axis which extends in a first direction; a blade disposed adjacent to the developer carrier and including a first end portion and a second end portion opposite to the first end portion in the first direction; and a supporting member supporting the blade, the method for manufacturing the developing device comprising the steps of:
    positioning the blade with respect to the supporting member; and
    welding the blade onto the supporting member by irradiating a laser beam onto the blade while moving at least one of the blade and the laser beam relative to the other of the blade and the laser beam,
    wherein the positioning includes: positioning the first end portion of the blade with respect to the supporting member in the first direction and a second direction perpendicular to the first direction; and positioning the second end portion of the blade with respect to the supporting member in the second direction without being positioned with respect to the first direction, and
    wherein the welding includes moving the laser beam relative to the blade from a first end portion side of the blade toward a second end portion side of the blade.

2. The method for manufacturing the developing device according to claim 1,
    wherein the welding includes irradiating the laser beam relative to the blade from the first end portion side of the blade toward the second end portion side of the blade intermittently.

3. The method for manufacturing the developing device according to claim 2,
    wherein the welding includes overlapping a second weld mark, which is located closer to the second end portion side of the blade, on a first weld mark, which is located closer to the first end portion of the blade, by the irradiating.

4. The method for manufacturing the developing device according to claim 1,
    wherein the first end portion has a first opening and the second end portion has a second opening, and
    wherein a cut depth of the second opening is greater than a cut depth of the first opening.

5. The method for manufacturing the developing device according to claim 1, wherein the positioning includes engaging the blade and the supporting member mutually.

6. The method for manufacturing the developing device according to claim 1,
    wherein the blade has a circular hole in the first end portion and an elongate hole in the second end portion, and the supporting member has a circular hole and an elongate hole, and
    wherein the positioning includes: attaching the supporting member to a jig, which has a first protrusion and a second protrusion, by inserting the first protrusion into the circular hole of the supporting member and the second protrusion into the elongate hole of the supporting member; and attaching the blade to the jig by inserting the first protrusion into the circular hole of the blade and the second protrusion into the elongate hole of the blade.

7. The method for manufacturing the developing device according to claim 1,
    wherein the blade has a circular hole in the first end portion and an elongate hole in the second end portion, and
    wherein the welding includes irradiating the laser beam relative to the blade along an imaginary line connecting a center of the circular hole and a center of the elongate hole.

8. The method for manufacturing the developing device according to claim 1,
    wherein the blade has a circular hole in the first end portion and an elongate hole in the second end portion, and
    wherein the welding includes irradiating the laser beam relative to a portion of the blade between a first end of the first end portion in the first direction and the circular hole, and a portion of the blade between a second end of the second end portion in the first direction and the elongate hole.

9. A developing device, comprising:
    a developer carrier having a rotation axis which extends in a first direction;
    a blade disposed adjacent to the developer carrier; and
    a supporting member joined to the blade by welding, and supporting the blade,
    the blade including:
        a first end portion in the first direction having a first engaging portion;
        a second end portion disposed opposite to the first end portion in the first direction and having a second engaging portion; and
        a first weld mark and a second weld mark formed between the first end portion and the second end portion and joining the blade to the supporting member,
    the supporting member including:
        a third engaging portion configured to engage with the first engaging portion such that the first engaging portion is positioned with respect to the third engaging portion in the first direction and a second direction perpendicular to the first direction; and
        a fourth engaging portion configured to engage with the second engaging portion such that the second engaging portion is positioned with respect to the fourth engaging portion in the second direction without being positioned with respect to the first direction, and
    wherein the second weld mark is located closer to the second engaging portion than the first weld mark and at least partially overlaps on the first weld mark.

10. The developing device according to claim 9, wherein a minimum distance in the first direction between a portion of the first engaging portion closest to a center of the blade in the first direction and the third engaging portion is shorter than a minimum distance in the first direction between a portion of the second engaging portion closest to the center of the blade in the first direction and the fourth engaging portion.

11. The developing device according to claim 9, wherein the first engaging portion having a first opening edge defining a first opening, and the second engaging portion having a second opening edge defining a second opening.

12. The developing device according to claim 11, wherein the first opening includes a first hole, and the second opening includes a second hole.

13. The developing device according to claim 12, wherein the second opening edge extends to a third end of the blade in the first direction and a fourth end of the blade in the second direction.

14. The developing device according to claim 12, wherein the first weld mark and the second weld mark are formed on a portion of the blade between a first end of the first end portion in the first direction and the first hole, and a portion between a second end of the second end portion in the first direction and the second hole.

15. The developing device according to claim 11, wherein the first opening edge extends to a first end of the blade in the first direction.

16. The developing device according to claim 15, wherein the first opening edge extends to a second end of the blade in the second direction.

17. The developing device according to claim 11,
wherein the third engaging portion includes a first protrusion, and the fourth engaging portion includes a second protrusion, and
wherein the first opening edge is in contact with the first protrusion, and the second opening edge is in contact with the second protrusion.

18. The developing device according to claim 11, wherein the first weld mark and the second weld mark are formed in line with the first opening edge and the second opening edge in the first direction.

19. The developing device according to claim 11, wherein the first weld mark and the second weld mark are formed closer to the developer carrier than the first opening edge and the second opening edge in the second direction.

20. The developing device according to claim 11, wherein the minimum distance between a portion of the second opening edge closest to the center of the blade in the first direction and the second protrusion in the first direction is 0.2 to 1.0 mm.

21. The developing device according to claim 9, wherein each of the first weld mark and the second weld mark has an arc shape which protrudes in the first direction.

22. The developing device according to claim 9, wherein the first weld mark and the second weld mark have a pattern having a plurality of arc-shaped protrusions, each of which protrudes toward the first engaging portion.

23. The developing device according to claim 9, wherein the third engaging portion includes a first protrusion, and the fourth engaging portion includes a second protrusion.

* * * * *